(12) United States Patent
Ueda

(10) Patent No.: US 6,590,201 B2
(45) Date of Patent: Jul. 8, 2003

(54) OPTICAL ENCODER INCORPORATING LINEAR LIGHT CONTROLLING MEMBER

(75) Inventor: Takashi Ueda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 19 days.

(21) Appl. No.: 09/741,172

(22) Filed: Dec. 21, 2000

(65) Prior Publication Data

US 2001/0025920 A1 Oct. 4, 2001

(30) Foreign Application Priority Data

Dec. 22, 1999 (JP) ............................................. 11-364182
Dec. 22, 1999 (JP) ............................................. 11-364183
Dec. 22, 1999 (JP) ............................................. 11-364184

(51) Int. Cl.$^7$ ................................................. G01D 5/34
(52) U.S. Cl. ............................. 250/231.13; 250/231.14; 250/231.16
(58) Field of Search ................... 250/231.13, 231.14, 250/231.15, 231.16, 231.17; 341/13, 31

(56) References Cited

U.S. PATENT DOCUMENTS

| | | | | |
|---|---|---|---|---|
| 4,259,570 A | | 3/1981 | Leonard | 250/214 |
| 4,263,506 A | | 4/1981 | Epstein | 250/231 |
| 4,266,125 A | | 5/1981 | Epstein et al. | 250/231 |
| 4,654,525 A | * | 3/1987 | Ebina et al. | 250/231.13 |
| 4,691,101 A | | 9/1987 | Leonard | 250/231 |
| 4,751,383 A | * | 6/1988 | Ueyama | 250/237 G |
| 4,904,861 A | | 2/1990 | Epstein et al. | 250/214 |
| 4,912,322 A | * | 3/1990 | Ichikawa | 250/237 G |

FOREIGN PATENT DOCUMENTS

| JP | 63-42420 | * | 2/1988 | 250/231.13 |
|---|---|---|---|---|

* cited by examiner

Primary Examiner—Huy Mai
(74) Attorney, Agent, or Firm—Michael D. Bednarek; Shaw Pittman LLP

(57) ABSTRACT

The optical encoder according to the present invention comprises an optical unit and a light controlling member. The optical unit includes a light emitter for emitting light and a light receiver for receiving the light from the light emitter. The light controlling member includes a plurality of transparent portions for passing the light from the light emitter and a plurality of nontransparent portions disposed alternately with the transparent portions for blocking the light from the light emitter. The transparent portion and the nontransparent portion are so arranged that any pair of adjacent transparent portion and nontransparent portion has a constant length in a direction of the adjacency. The optical unit and the light controlling member are movable relative to each other in a direction of arranging the transparent and the nontransparent portions. The light receiver is provided with one or any greater number of light receiver groups each including a plurality of adjacent light receiving elements arranged in a direction of the relative movement between the optical unit and the light controlling member. Each light receiver group has, in said direction of the relative movement, a length which is unequal to said constant length of the adjacent transparent portion and nontransparent portion.

8 Claims, 25 Drawing Sheets

FIG.7
OUTPUT OF ADDER 15
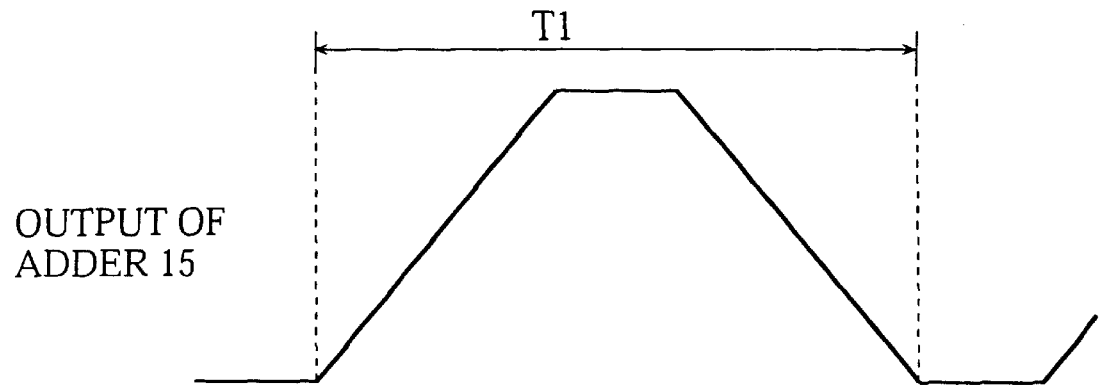
OUTPUT OF ADDER 16
0 LEVEL
OUTPUT OF COMPARATOR 19
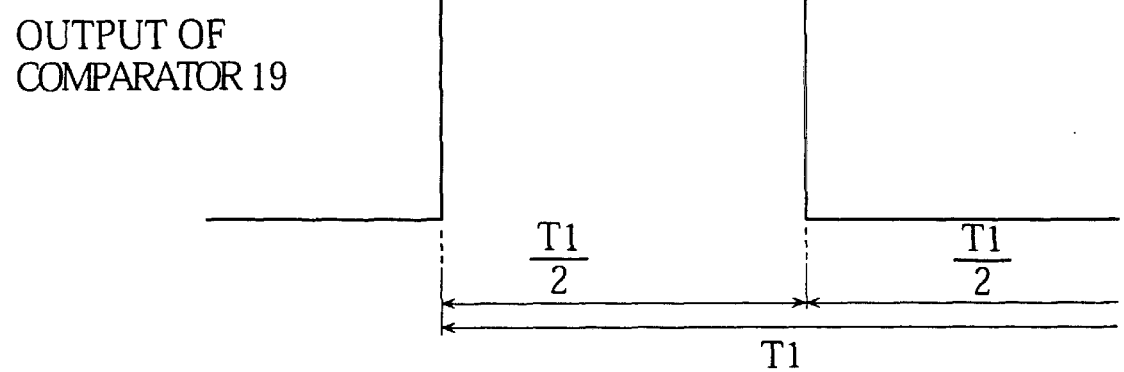

OPTICAL ENCODER INCORPORATING LINEAR LIGHT CONTROLLING MEMBER

BACKGROUND OF THE INVENTION

1. Technical Field of the Invention

The present invention relates to an optical encoder for detecting a position in movement, in rotation and so on.

2. Description of the Related Art

In an inkjet printer for example, printing is performed while moving the printing head. Therefore, it is necessary to accurately detect the position of the printing head in the movement. In such a case as this, use of an optical encoder makes possible to accurately detect the position of the moving printing head.

An example of the optical encoder is disclosed in JP-A-61-292016 (corresponding U.S. Pat. No. 4,691,101). This optical encoder comprises, as shown in FIG. 24, an optical unit 103 including a light emitter 101 and a light receiver 102, and a light controlling member 105 disposed between the light emitter 101 and the light receiver 102. The optical unit 103 and the light controlling member 105 can move relative to each other longitudinally of the light controlling member 105. For example, if the optical member 103 is mounted on the printing head of the inkjet printer and the light controlling member 105 is fixed to a case of the inkjet printer, the optical unit 103 moves along the light controlling member 105 when the printing head moves.

The light controlling member 105 is made of a ribbon-like resin film for example, and as shown in FIG. 25, formed with a plurality of transparent portions 106 and nontransparent portions 107 alternating with each other. All of the transparent portions 106 have a same length longitudinally of the light controlling member 105. All of the nontransparent portions 107 have a same length longitudinally of the light controlling member 105. Further, the length of the transparent portion 106 longitudinally of the light controlling member 105 and the length of the nontransparent portion 107 longitudinally of the light controlling member 105 are equal to each other. In other words, in a pairs of adjacent transparent portion 106 and nontransparent portion 105, a length L as a sum of the length of the transparent portion 106 longitudinally of the light controlling member 105 and the length of the nontransparent portion 107 longitudinally of the light controlling member 105 is constant in any pair of the transparent portion 106 and the nontransparent portion 107.

The light receiver 102 includes, as shown in FIG. 26, a photodiode group 111 made of four photodiodes 111a–111d. These four photodiodes 111a–111d are arranged close to each other in the direction of the relative movement between the optical unit 103 and the light controlling member 105. All of the photodiodes 111a –111d have a same length in the direction of the arrangement, and a total of the four lengths is K. In other words, a length of the photodiode group 111 in the direction of the relative movement between the optical unit 103 and the light controlling member 105 is K. In the above arrangement, K and L are exactly equal to each other or generally equal to each other within a manufacturing error. It should be noted here that there is a slight gap between each pair of adjacent photodiodes 111a–111d due to technical reasons of manufacture, but these gaps are not illustrated in FIG. 26.

The photodiodes 111a–111d have output terminals connected with input terminals of four adders 113–116 as shown in FIG. 27. Specifically, the input terminals of the adder 113 are connected with the output terminals of the photodiodes 111a, 111b. The input terminals of the adder 114 are connected with the output terminals of the photodiodes 111c, 111d. The input terminals of the adder 115 are connected with the output terminals of the photodiodes 111b, 111c. The input terminals of the adder 116 are connected with the output terminals of the photodiodes 111a, 11d. The adders 113–116 have output terminals connected with input terminals of two comparators 118, 119. Specifically, the input terminals of the comparator 118 are connected with the output terminals of the adders 113, 114. The input terminals of the comparator 119 are connected with the output terminals of the adders 115, 116.

If the light controlling member 105 moves in a direction indicated by Arrow A in FIG. 25 at a constant speed, or if the optical unit 103 moves in a direction opposite to the direction indicated by Arrow A at a constant speed, the photodiodes 111a–111d give output signals as shown in FIG. 28.

Therefore, outputs from the adders 113, 114 and the comparator 118 are as shown in FIG. 29. It should be noted here that the comparator 118 outputs a high-level signal if the output from the adder 113 is greater than the output from the adder 114.

Further, outputs from the adders 115, 116 and the comparator 119 are as shown in FIG. 30. The comparator 119 outputs a high-level signal if the output from the adder 115 is greater than the output from the adder 116.

As described, in the prior art optical encoder, the photodiodes 111a–111d are so manufactured that the photodiode group 111 has the dimension K that is equal to the dimension L as the sum of one transparent portion 106 and one nontransparent portion 107, thereby obtaining from the comparator 118 and the comparator 119 the output signals having a phase shift of a quarter of the period.

However, according to the prior art optical encoder, in order to make the dimension K and the dimension L as exactly the same as possible, the photodiodes 111a–111d must be manufactured at a high accuracy, leading to a problem of increased cost of manufacture. Further, at an occasion when the dimension L is altered for improved detection accuracy, or for manufacture of a plurality of kinds of the product each having a different value in the dimension L, it is necessary to differentiate the size of the photodiode group 111 for each specific value of the dimension L in the manufacture of the optical unit 113, leading again to the problem of increased cost of manufacture. Further, even if the comparator 118 and the comparator 119 give output signals having the phase shift Of a quarter of the period, advantage of receiving such signals can only be fully enjoyed in a special application. In a general application such as position detection of the printing head in an inkjet printer, the phase shift between the output from the comparator 118 and the output from the comparator 119 may not necessarily be a quarter of the period, but rather it is only necessary that the output from the comparator 118 and the output from the comparator 119 are comparable so as to discern the direction of the relative movement between the optical unit 103 and the light controlling member 105.

Further, according to the above prior art optical encoder, the photodiodes 111a–111d are arranged in a line in the direction of the relative movement between the optical unit 103 and the light controlling member 105. With this arrangement, if the length L of the pair of transparent portion 106 and nontransparent portion 105 is small, the outputs from the photodiodes 111a–111d are small, which leads to deterioration in S/N ratio and a problem to detect accurately.

Specifically, in order to improve detection accuracy of the optical encoder, the length L of the pair of transparent portion 106 and nontransparent portion 107 must be made small, which obviously means the length of the array of the photodiodes 111a–111d must be small. However, due to technical reasons in manufacture, there is unavoidably a gap or a region of low sensitivity between each adjacent pair of the photodiodes 111a–111d. For this reason, if the length of the array of the photodiodes 111a–111d is made small, ratio of the low-sensitivity region to the high-sensitivity region increases, causing a sharp drop in the output from the photodiodes 111a –111d. As a result, the S/N ratio of the output signals from the photodiodes 111a–111d decreases, leading to inability to detect even if the signals are amplified. Therefore, the original objective, which is improvement in the detection accuracy, cannot be achieved.

Further, according to the prior art optical encoder, a large number of photodiodes 111a–111d are used to make the photodiode group 111. This has been another cause of the problem of increased cost of manufacture.

Specifically, even if the four photodiodes 111a–111d are used in the photodiode group 111, and output signals having the quarter phase shift are obtained from the comparator 118 and the comparator 119, advantage of using such signals can be fully enjoyed only in limited applications as has been described earlier.

It should be noted also that there is another prior art optical encoder in which the photodiode group is made of six photodiodes. Again, in this case, when the encoder is applied to a general purpose such as in the inkjet printer, outputs from only two comparators out of three are used for discerning the direction of relative movement between the optical unit and the light controlling member.

DISCLOSURE OF THE INVENTION

An object of the present invention to provide an optical encoder which can be manufactured at a favorably low cost.

Another object of the present invention is to provide an optical encoder having a favorably improved detection accuracy.

According to a first aspect of the present invention, there is provided an optical encoder comprising: an optical unit including a light emitter for emitting light and a light receiver for receiving the light from the light emitter; and a light controlling member including a plurality of transparent portions for passing the light from the light emitter and a plurality of nontransparent portions disposed alternately with the transparent portions for blocking the light from the light emitter. The transparent and the nontransparent portions are so arranged that any pair of adjacent transparent portion and nontransparent portion has a constant length in a direction of the adjacency. The optical unit and the light controlling member are movable relative to each other in a direction of arranging the transparent and the nontransparent portions. The light receiver is provided with one or any greater number of light receiver groups each including a plurality of adjacent light receiving elements arranged in a direction of the relative movement between the optical unit and the light controlling member. Each light receiver group has, in said direction of the relative movement, a length which is unequal to said constant length of the adjacent transparent portion and nontransparent portion.

According to a preferred embodiment, each of the light receiving elements in each light receiver group has a same length in a direction of the arranging the light receiving elements. Further, the length of each light receiver group in said direction of the relative movement is greater than a sum of said constant length of the adjacent transparent and nontransparent portions and a length of one light receiving element measured in the direction of arranging the light receiving elements.

According to another preferred embodiment, the light receiver groups are disposed at a predetermined pitch, and the predetermined pitch is equal to or a multiple of said constant length of the adjacent transparent and nontransparent portions.

According to a second aspect of the present invention, there is provided an optical encoder comprising: an optical unit including a light emitter for emitting light and a light receiver for receiving the light from the light emitter; and a light controlling member including a plurality of transparent portions for passing the light from the light emitter and a plurality of nontransparent portions disposed alternately with the transparent portions for blocking the light from the light emitter. The transparent and the nontransparent portions are so arranged that any pair of adjacent transparent portion and nontransparent portion has a constant length in a direction of the adjacency. The optical unit and the light controlling member are movable relative to each other in a direction of arranging the transparent and nontransparent portions. The light receiver is provided with one or any greater number of light receiver groups each including a plurality of adjacent light receiving elements arranged in a direction of the relative movement between the optical unit and the light controlling member. Each light receiver group has, in said direction of the relative movement, a length which is generally equal to said constant length of the adjacent transparent portion and nontransparent portion. The light receiving elements in each light receiver group are arranged in one line and adjacent line both extending in said direction of the relative movement. Said lines are spaced from each other in a direction perpendicular to said direction of the relative movement. The light receiving elements in said one line are offset from the light receiving elements in said adjacent line in said direction of the relative movement.

According to a preferred embodiment, each light receiver group includes four light receiving elements identical in shape and size. Two of the light receiving elements are arranged in said one line, while the other two light receiving elements are arranged in said adjacent line. The two light receiving elements in said one line are offset, in said direction of the relative movement, from the other two light receiving elements in said adjacent line by half a predetermined pitch at which the light receiving elements in each line are arranged.

According to another preferred embodiment, more than one light receiver group is arranged in said direction of the relative movement.

According to a third aspect of the present invention, there is provided an optical encoder comprising: an optical unit including a light emitter for emitting light and a light receiver for receiving the light from the light emitter; and a light controlling member including a plurality of transparent portions for passing the light from the light emitter and a plurality of nontransparent portions disposed alternately with the transparent portions for blocking the light from the light emitter. The transparent and the nontransparent portions are so arranged that any pair of adjacent transparent portion and nontransparent portion has a constant length in a direction of the adjacency. The optical unit and the light controlling member are movable relative to each other in a direction of arranging the transparent and the nontransparent portions. The light receiver is provided with one or any greater number of light receiver groups each including a plurality of adjacent light receiving elements arranged in a direction of the relative movement between the optical unit and the light controlling member. Each light receiver group includes three or greater odd number of light receiving elements. Said direction of the relative movement is discerned on a basis of both an output from one of the light receiving elements and a comparison between outputs from two of the remaining light receiving elements.

According to a preferred embodiment, each light receiver group includes three light receiving elements.

According to another preferred embodiment, each light receiver group has, in said direction of the relative movement, a length which is generally equal to said constant length of the adjacent transparent and nontransparent portions.

According to still another preferred embodiment, the odd number of light receiving elements except one of them have a same length in a direction of arranging the light receiving elements.

According to still another preferred embodiment, the light receiver groups are disposed at a predetermined pitch, and the predetermined pitch is equal to or a multiple of said constant length of the adjacent transparent and nontransparent portions.

Other characteristics and advantages of the present invention will become clearer from the following description of embodiments to be presented with reference to the accompanying drawings.

BRIEF DESCRIPTION OF THE DRAWINGS

FIG. 7 is a diagram showing waveforms of output signals from adders and a comparator in FIG. 4.

DETAILED DESCRIPTION OF PREFERRED EMBODIMENTS

Hereinafter, an embodiment of the present invention will be described with reference to FIG. 1–FIG. 7.

Figure 1:
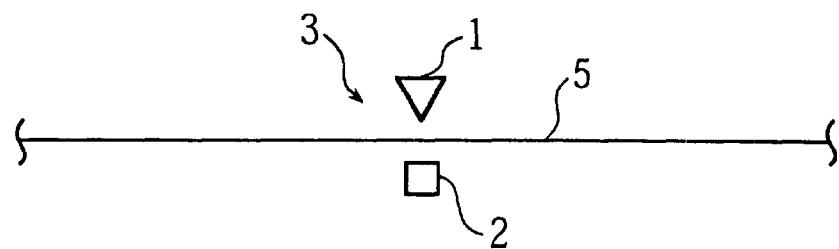
FIG. 1 is a schematic diagram of an optical encoder according to the present invention.

FIG. 1 is a schematic diagram of an optical encoder according to the present invention. The optical encoder comprises an optical unit 3 including a light emitter 1 and a light receiver 2, and a light controlling member 5 disposed between the light emitter 1 and the light receiver 2. The light emitter 1 is provided with a light emitting diode for example. The optical unit 3 and the light controlling member 5 can move relative to each other longitudinally of the light controlling member 5. For example, if the optical unit 3 is mounted on a printing head of an inkjet printer, and the light controlling member 5 is fixed to a case of the inkjet printer, the optical unit 3 moves along the light controlling member 5 when the printing head moves. Obviously, the optical unit 3 may be provided on the fixed side and the light controlling member 5 may be provided on the moving side. Obviously further, the optical unit 3 and the light controlling member 5 may be moved in opposite directions to each other. Still further, both of the optical unit 3 and the light controlling member 5 may be moved in a same direction at different constant speeds.

Figure 2:
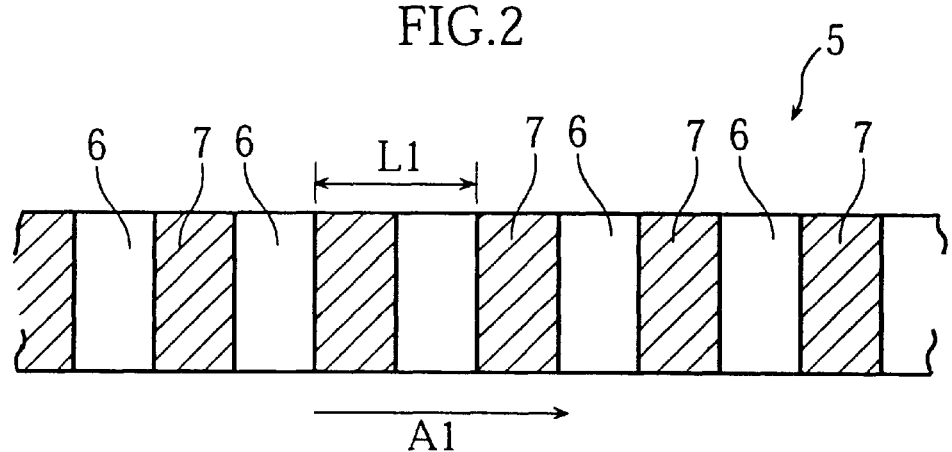
FIG. 2 is a front view of a light controlling member in FIG. 1.

The light controlling member 5 is made of a ribbon-like resin film for example, and as shown in FIG. 2, formed with a plurality of transparent portions 6 and nontransparent portions 7 alternating with each other. All of the transparent portions 6 have a same length longitudinally of the light controlling member 5. All of the nontransparent portions 7 have a same length longitudinally of the light controlling member 5. Further, the length of the transparent portion 6 longitudinally of the light controlling member 5 and the length of the nontransparent portion 6 longitudinally of the light controlling member 5 are equal to each other. In other words, in a pair of adjacent transparent portion 6 and nontransparent portion 7, a length L1 as a sum of the length of the transparent portion 6 longitudinally of the light controlling member 5 and the length of the nontransparent portion 7 longitudinally of the light controlling member 5 is constant in any pair of the transparent portion 6 and the nontransparent portion 7.

Figure 3:
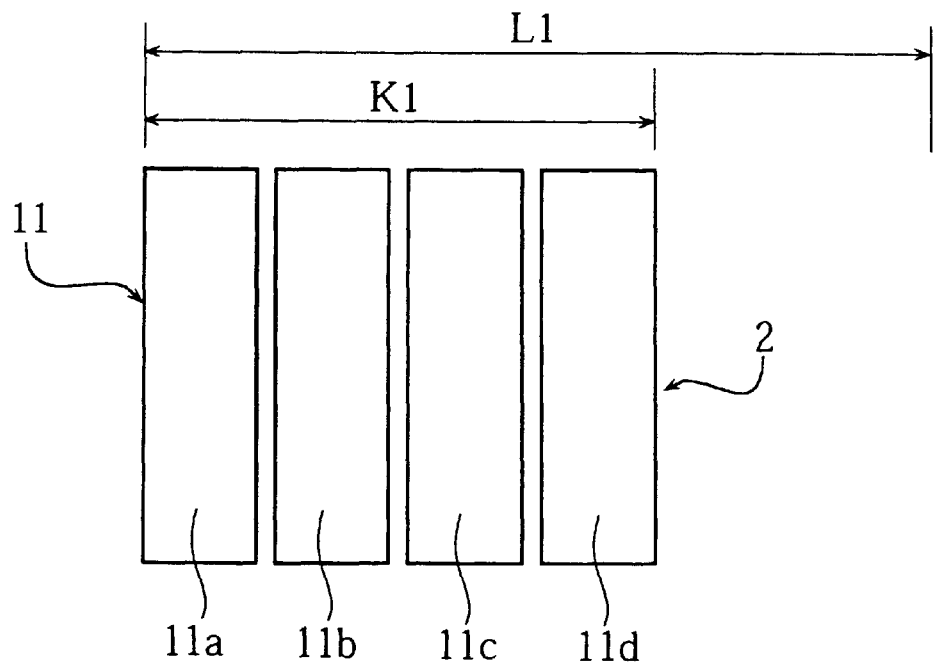
FIG. 3 is a front view of a light receiver in FIG.

The light receiver 2 includes, as shown in FIG. 3, a photodiode group 11 made of four photodiodes 11a–11d for example. These four photodiodes 11a–11d are arranged in the direction of the relative movement between the optical unit 3 and the light controlling member 5. All of the photodiodes 11a–11d have a same length in the direction of the arrangement, and a total of the four lengths is K1. In other words, a length of the photodiode group 11 in the direction of the relative movement between the optical unit 3 and the light controlling member 5 is K1. In the above arrangement, K1 is shorter than L1. More specifically, according to the present embodiment, K1 is given by the following expression: K1=(2/3)L1. In other words, K1 equals the length of four of the photodiodes 11a, whereas L1 equals the length of six of the photodiodes 11a.

Figure 4:
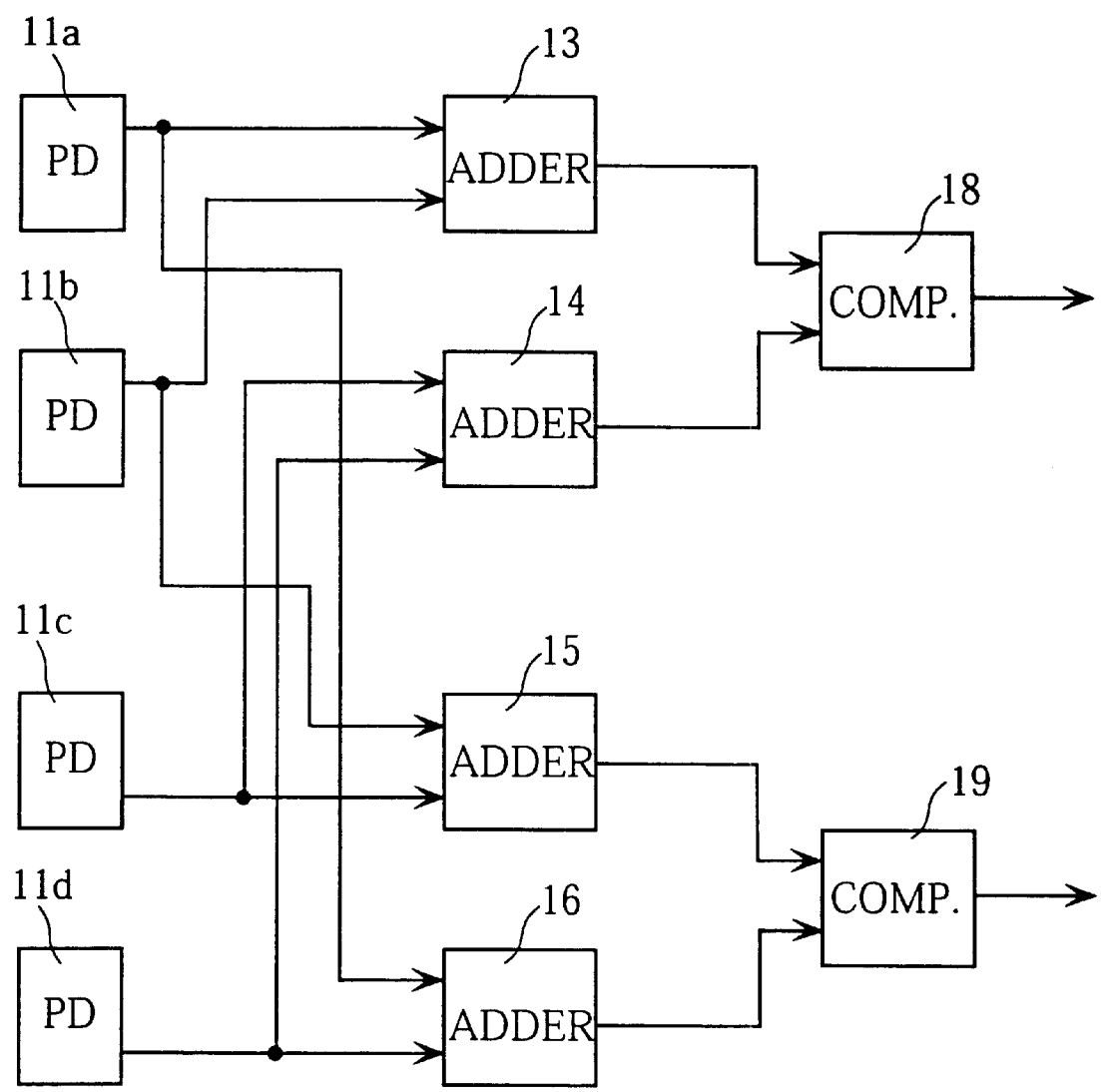
FIG. 4 is a circuit block diagram showing a principal portion of a signal processing circuit for a signal from the light receiver in FIG. 1.

The photodiodes 11a–11d have output terminals connected with input terminals of four adders 13–16 as shown in FIG. 4. Specifically, the input terminals of the adder 13 are connected with the output terminals of the photodiodes 11a, 11b. The input terminals of the adder 14 are connected with the output terminals of the photodiodes 11c, 11d. The input terminals of the adder 15 are connected with the output terminals of the photodiodes 11b, 11c. The input terminals of the adder 16 are connected with the output terminals of the photodiodes 11a, 11d. The adders 13–16 have output terminals connected with input terminals of two comparators 18, 19. Specifically, the input terminals of the comparator 18 are connected with the output terminals of the adders 13, 14. The input terminals of the comparator 19 are connected with the output terminals of the adders 15, 16.

Next, an operation is described. When the optical unit 3 and the light controlling member 5 make a relative movement longitudinally of the light controlling member 5, the transparent portion 6 and the nontransparent portion 7 of the light controlling member 5 alternately come between the light emitter 1 and the light receiver 2 of the optical unit 3. Therefore, there is a continuous alternation between a state in which light from the light emitter 1 passes through the transparent portion 6 and thus received by the photodiodes 11a–11d of the light receiver 2 and another state in which the light is blocked by the nontransparent portion 7 and thus not received by the photodiodes 11a–11d. If this is viewed from each of the photodiodes 11a–11d, there is a continuous cycle of four states in which a band of the light coming into each of the photodiodes 11a–11d takes different patterns. Specifically, there is a state in which the light is partially blocked by the nontransparent portion 7 and an area of the blockage is gradually decreasing. There is another state in which the light is not blocked at all by the nontransparent portion 7. Still another is a state in which the light is partially blocked by the nontransparent portion 7 and an area of the blockage is gradually increasing, and lastly, there is another state in which the light is completely blocked by the nontransparent portion 7. In the above, phase of the cycle in the photodiodes 11a–11d is sequentially shifted by ⅙ of a period of the cycle, because of a relationship between the length L1 of one pair of transparent portion 6 and nontransparent portion 7 of the light controlling member 5 and the length of each of the photodiodes 11a–11d in the photodiode group 11, as given by the expression (K1)/4=(L1)/6.

Figure 5:
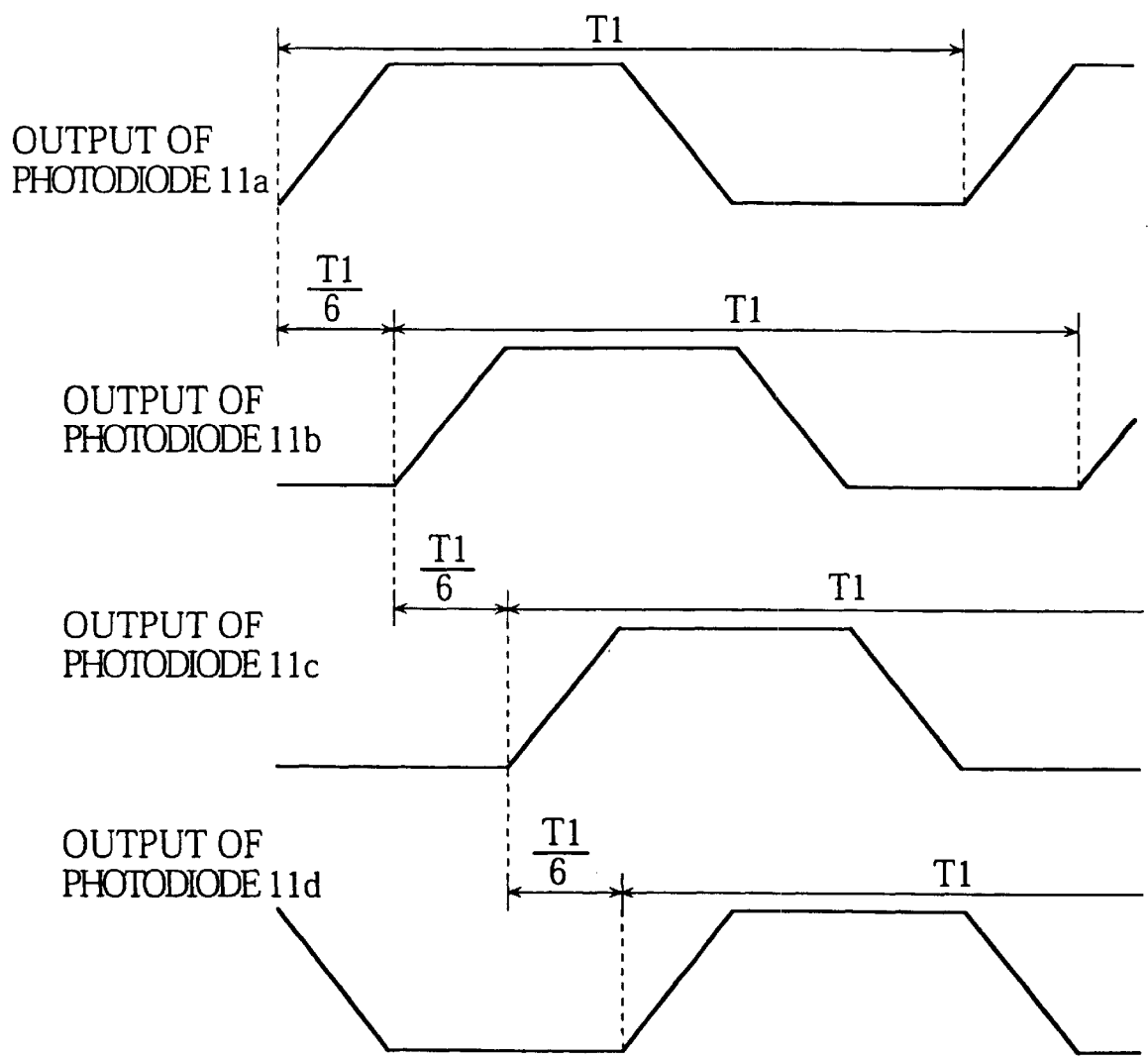
FIG. 5 is a diagram showing waveforms of output signals from photodiodes in FIG. 3.

Therefore, if the light controlling member 5 moves at a constant speed in a direction indicated by Arrow A1 in FIG. 2, or if the optical unit 3 moves at a constant speed in a direction opposite to the direction indicated by Arrow A, the photodiodes 11a–11d give output signals as shown in FIG. 5. As understood from FIG. 5, each of the output signals from the photodiodes 11a–11d has a period of T1, and there is a sequential phase shift of (T1)/6. The period T1 is determined by a relationship among; the length L1 of the pair of transparent portion 6 and nontransparent portion 7 of the light controlling member 5, the length of each of the photodiodes 11a–11d in the photodiode group 11 as given by the expression (K1)/4=(L1)/6, and a speed of the relative movement between the optical unit 3 and the light controlling member 5.

Figure 6:
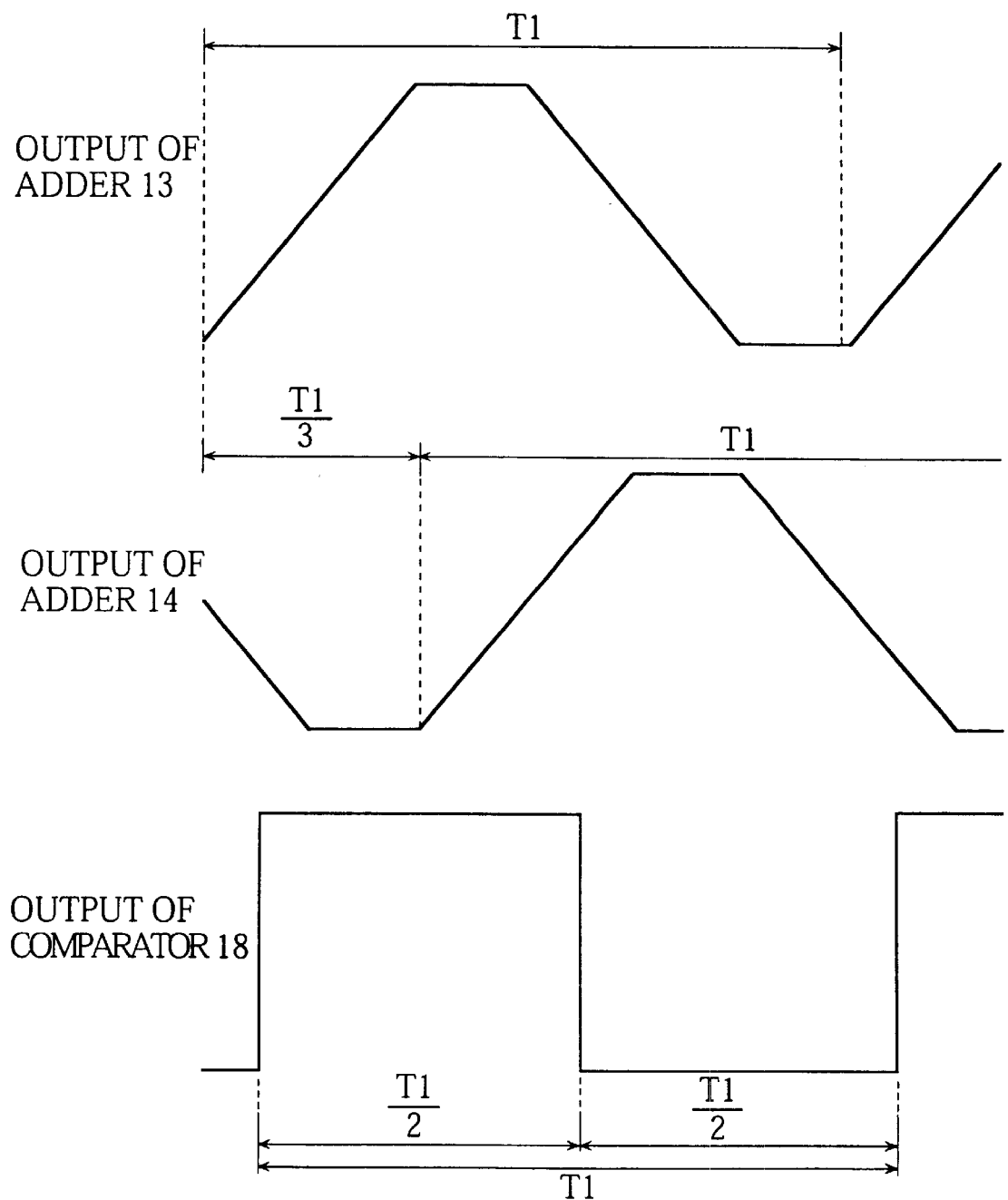
FIG. 6 is a diagram showing waveforms of output signals from adders and a comparator in FIG. 4.

The adder 13 outputs a sum of the output from the photodiode 11a and the output from the photodiode 11b. The adder 14 outputs a sum of the output from the photodiode 11c and the output from the photodiode 11d. Therefore, the outputs from these adders are as shown in FIG. 6. The comparator 18 outputs a high-level signal if the output from the adder 13 is greater than the output from the adder 14, while outputting a low-level signal if the output from the adder 13 is smaller than the output from the adder 14. Thus, the output from the comparator 18 is as shown in FIG. 6. As is clear from FIG. 6, the outputs from the adders 13, 14 have the same period T1 as of the outputs from the photodiodes 11a–11d. There is a phase shift of (T1)/3 between the output from the adder 13 and the output from the adder 14. The output from the comparator 18 has the same period as the outputs from the adders 13, 14. The output from the comparator 18 is a square pulse, with both of the ON period and OFF period having a length of (T1)/2.

The adder 15 outputs a sum of the output from the photodiode 11b and the output from the photodiode 11c. The adder 16 outputs a sum of the output from the photodiode 11a and the output from the photodiode 11d. Therefore, the outputs from these adders are as shown in FIG. 7. The comparator 19 outputs a high-level signal if the output from the adder 15 is greater than the output from the adder 16, while outputting a low-level signal if the output from the adder 15 is smaller than the output from the adder 16. Thus, the output from the comparator 19 is as shown in FIG. 7. As is clear from FIG. 7, the output from the adder 15 has the same period T1 as each of the outputs from the photodiodes 11a–11d. The output from the adder 16 is constant. The output from the comparator 19 has the same period T1 as the output from the adder 15. The output from the comparator 19 is a square pulse, with both of the ON period and OFF period having a period of (T1)/2.

As is clear from comparison between FIG. 6 and FIG. 7, the output from the comparator 18 and the output from the comparator 19 are both square pulses having the period of T1, and there is a phase shift of (T1)/4 in between. It should be noted here that the phase shift between the output from the comparator 18 and the output from the comparator 19 can vary within a range between minus (T1)/2 and plus (T1)/2 depending on a relationship between the length L1 of the pair of transparent portion 6 and nontransparent portion 7 of the light controlling member 5 and the length K1 of the photodiodes 11a–11d of the photodiode group 11. In the above range, if the phase shift is close to zero, it becomes difficult to discern the direction of the relative movement between the optical unit 3 and the light controlling member 5. In consideration of this as well as factors such as detection error caused by vibration given to the light controlling member 5, it is preferable that the relationship between L1 and K1 be so controlled that the phase shift between the output from the comparator 18 and the output from the comparator 19 is not smaller than 5% of the period T1.

With the above arrangement, if the direction of the relative movement between the optical unit 3 and the light controlling member 5 is reversed, then the output from the comparator 19 does not change but the output from the comparator 18 is reversed. Therefore, the direction of the relative movement between the optical unit 3 and the light controlling member 5 can be determined by checking the level of output from the comparator 18 upon rising or falling of the output from the comparator 19 for example. Obviously, by counting the number of output pulses from the comparator 18 or the comparator 19, distance of the relative movement between the optical unit 3 and the light controlling member 5 can be obtained.

As described, the length K1 of the photodiode group 11 in the direction of the relative movement between the optical unit 3 and the light controlling member 5 is smaller than the length L1 of the pair of adjacent transparent portion 6 and nontransparent portion 7 as measured in the direction of the adjacency. Therefore, manufacturing cost can be reduced significantly.

In other words, manufacturing accuracy of the photodiodes 11a–11d of the photodiode group 11 is no longer critical, because it is no longer necessary that the length K1 of the photodiode group 11 in the direction of the relative movement between the optical unit 3 and the light controlling member 5 must be made as exactly the same as the length L1 of the pair of adjacent transparent portion 6 and nontransparent portion 7 as measured in the direction of the adjacency. As a result, manufacturing cost can be reduced.

Further, at an occasion when the length L1 of the pair of adjacent transparent portion 6 and nontransparent portion 7 as measured in the direction of the adjacency has to be altered for improved detection accuracy, or when manufacturing a plurality of kinds of the product each having a unique value in the length L1 of the pair of adjacent transparent portion 6 and nontransparent portion 7 as measured in the direction of the adjacency, it is no longer necessary to differentiate the size of the photodiode group 11 for each unique value given as the length L1 of the pair of adjacent transparent portion 6 and nontransparent portion 7 as measured in the direction of the adjacency in the manufacture of the optical unit 3. This makes possible to reduce the cost of manufacture through increased effect of mass production. In other words, it becomes possible to make various kinds of the optical encoder each having a different detection accuracy, without changing the optical unit 3 but only by changing the light controlling member 5.

It should be noted that four adders 13–16 are provided according to the embodiment described above. This arrangement is adopted for virtually increasing the area of light reception in the photodiodes 11a–11d by adding the outputs from the photodiodes 11a–11d thereby increasing the inputs to the comparators 18, 19. Therefore, the adders 13–16 may not necessarily be provided. Specifically, the outputs from the photodiodes 11a, 11c may be supplied to the comparator 18 and the outputs from the photodiodes 11b, 11d may be supplied to the comparator 19. With such an arrangement as this, the adders 13–16 can be eliminated and circuit can be simplified, leading to further reduction in the cost of manufacture.

Further, according to the embodiment described above, the length K1 of the four photodiodes 11a–11d of the photodiode group 11 is smaller than the length L1 which is the sum of the lengths of one transparent portion 6 and one nontransparent portion 7 of the light controlling member 5. However, this arrangement may be replaced by an arrangement in an embodiment shown in FIG. 8. Specifically, K2 which is a length of four photodiodes 21a–21d of a photodiode group 21 is greater than the length L1 of the pair of transparent portion 6 and nontransparent portion 7 of the light controlling member 5. According to the embodiment in FIG. 8, the following relationship exists: K2=(4/3)L1.

Figure 9:
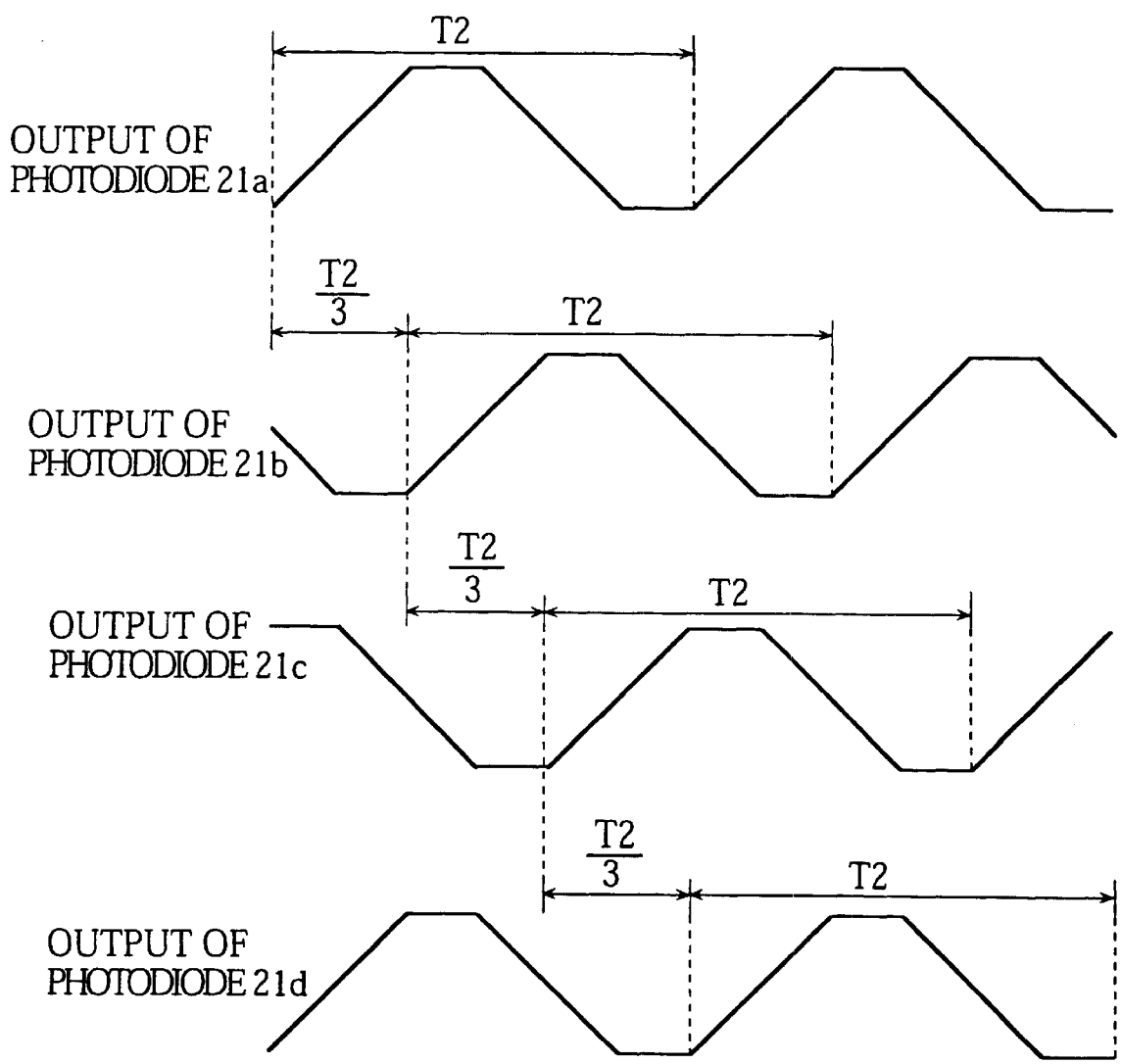
FIG. 9 is a diagram showing waveforms of output signals from photodiodes according to the embodiment in FIG. 8.

In this case, an output from each of the photodiodes 21a–21d is as shown in FIG. 9. As is clear from FIG. 9, each of the output signals from the photodiodes 21a–21d has a period of T2, and there is a sequential phase shift of (T2)/3.

Figure 10:
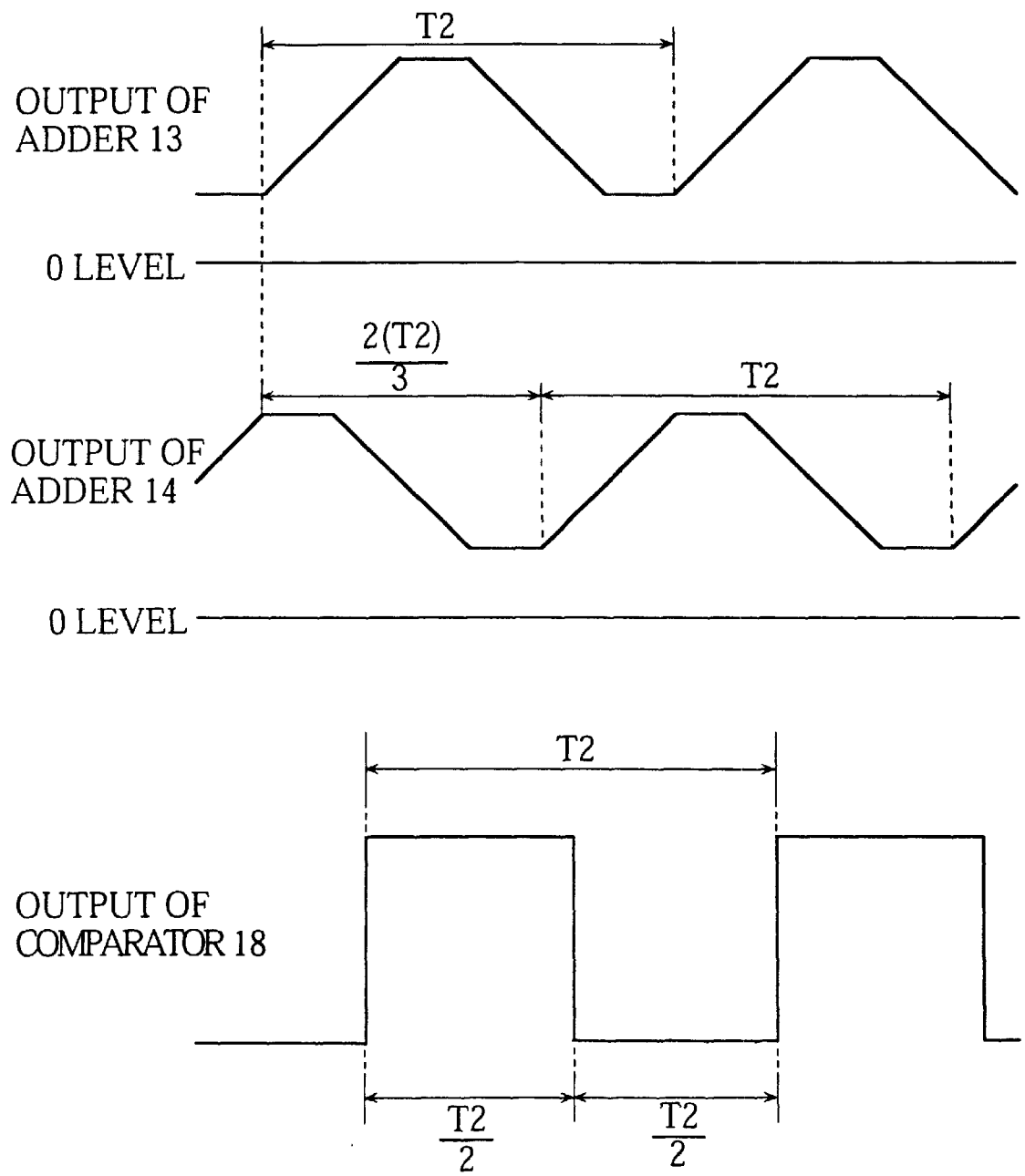
FIG. 10 is a diagram showing waveforms of output signals from adders and a comparator according to the embodiment in FIG. 8.

Further, as is clear from FIG. 10, output from the adders 13, 14 has the same period T2 as output from the photodiodes 21a–21d. There is a phase shift of (T2)/3 between the output from the adder 13 and the output from the adder 14. An output from the comparator 18 has the same period T2 as the outputs from the adders 13, 14. The output from the comparator 18 is a square pulse, with both of the ON period and OFF period having a period of (T2)/2.

Figure 11:
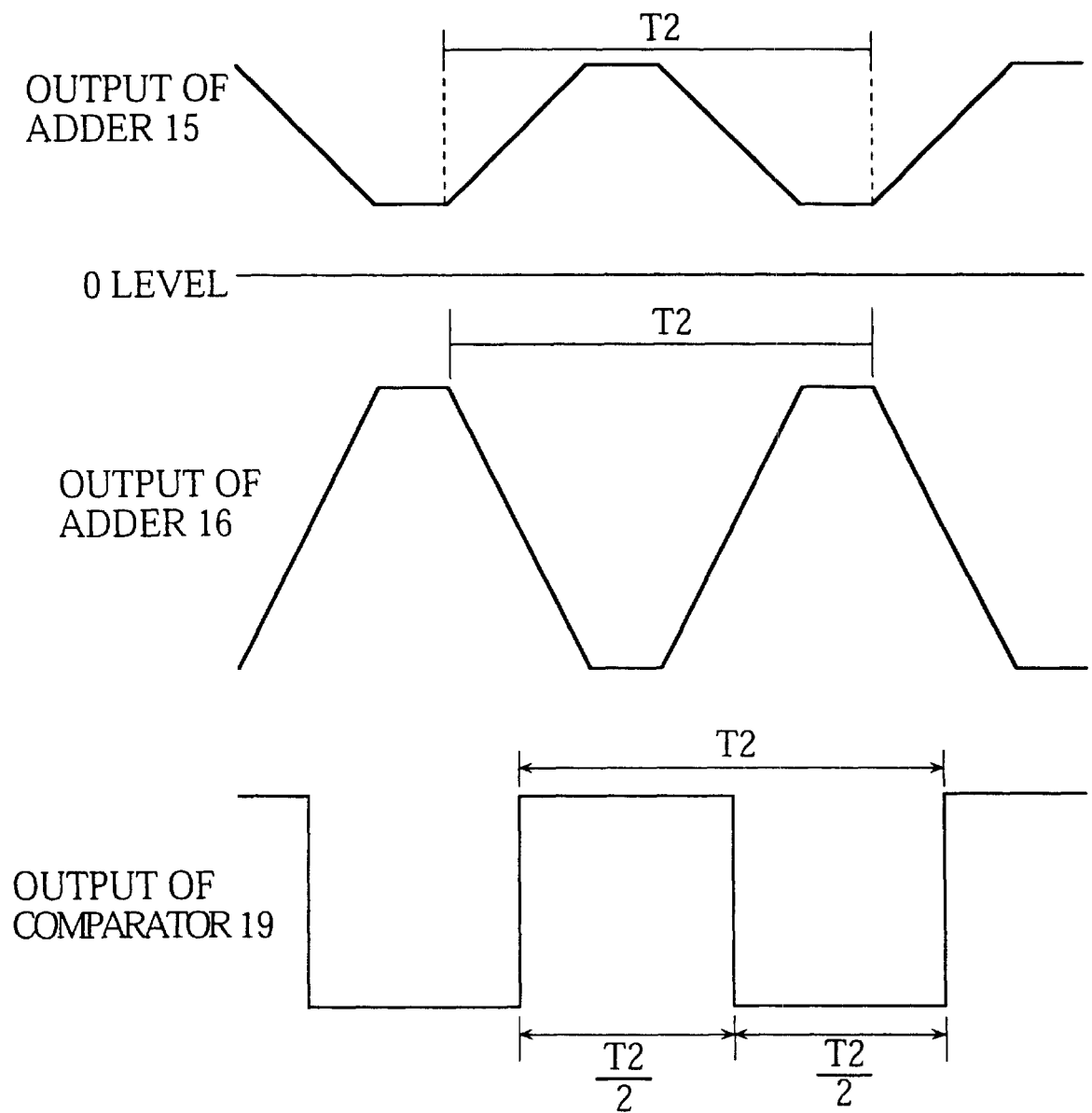
FIG. 11 is a diagram showing waveforms of output signals from adders and a comparator according to the embodiment in FIG. 8.

As is clear from FIG. 11, outputs from the adders 15, 16 have the same period T2 as output from the photodiodes 21a–21d. Output from the comparator 19 has the same period T2 as the outputs from the adders 15, 16. The output from the comparator 19 is a square pulse, with both of the ON period and OFF period having a period of (T2)/2.

As is clear from comparison between FIG. 10 and FIG. 11, the output from the comparator 18 and the output from the comparator 19 are both square pulses having the period of T2, and there is a phase shift of (T2)/4 in between.

Figure 12:
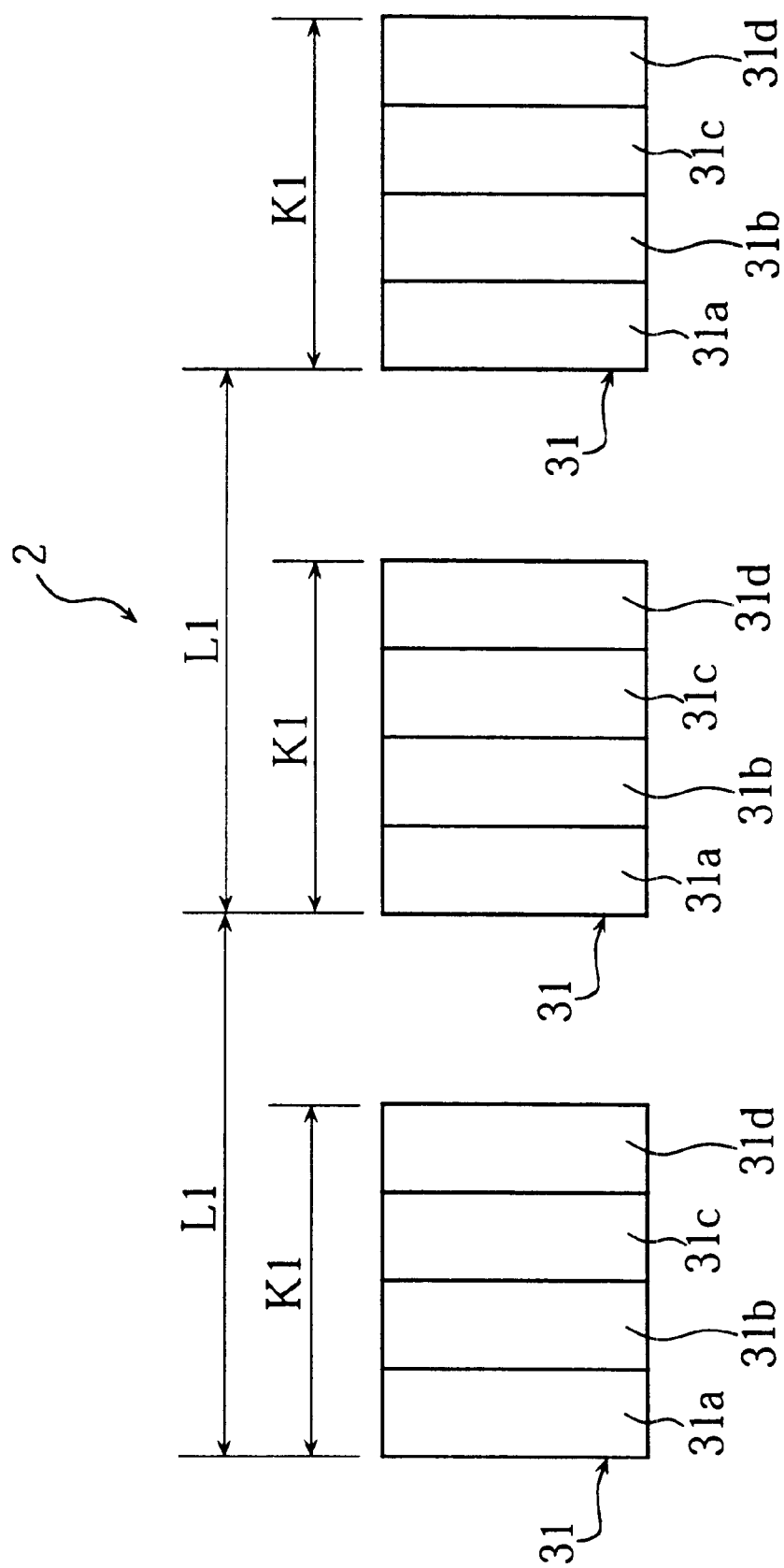
FIG. 12 is a front view of a light receiver according to still another embodiment.

Further, according to the embodiment shown in FIG. 3, the light receiver 2 includes one photo diode group 11. Alternatively however, the light receiver may be provided by a plurality of photodiode groups 31 as shown in FIG. 12. In this case, the photodiode groups 31 are disposed at a pitch equal to the length L1 of the pair of transparent portion 6 and nontransparent portion 7. According to this arrangement, each of the photodiodes 31a–31d includes the above plurality of photodiodes. Thus, by adding the outputs from these photodiodes, a large output can be obtained. It should be noted that an additional photodiode may be provided in a space between a pair of adjacent photodiode groups 31. The additional photodiode may or may not provide an output for other usage. Further, the space may be provided with a semiconductor device other than the photodiode or with a wiring pattern. Obviously, nothing may be provided in the space.

Figure 8:
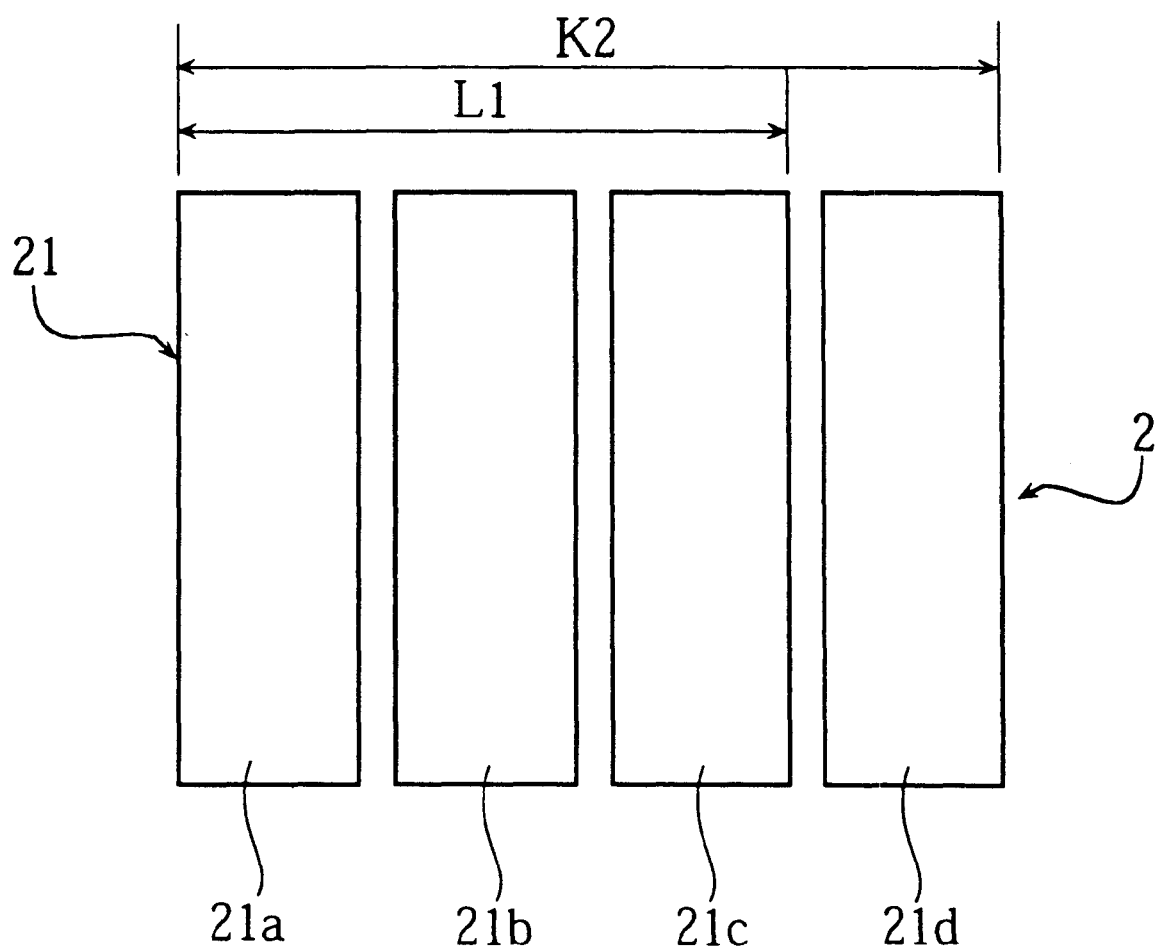
FIG. 8 is a front view of a light receiver according to another embodiment.
Figure 13:
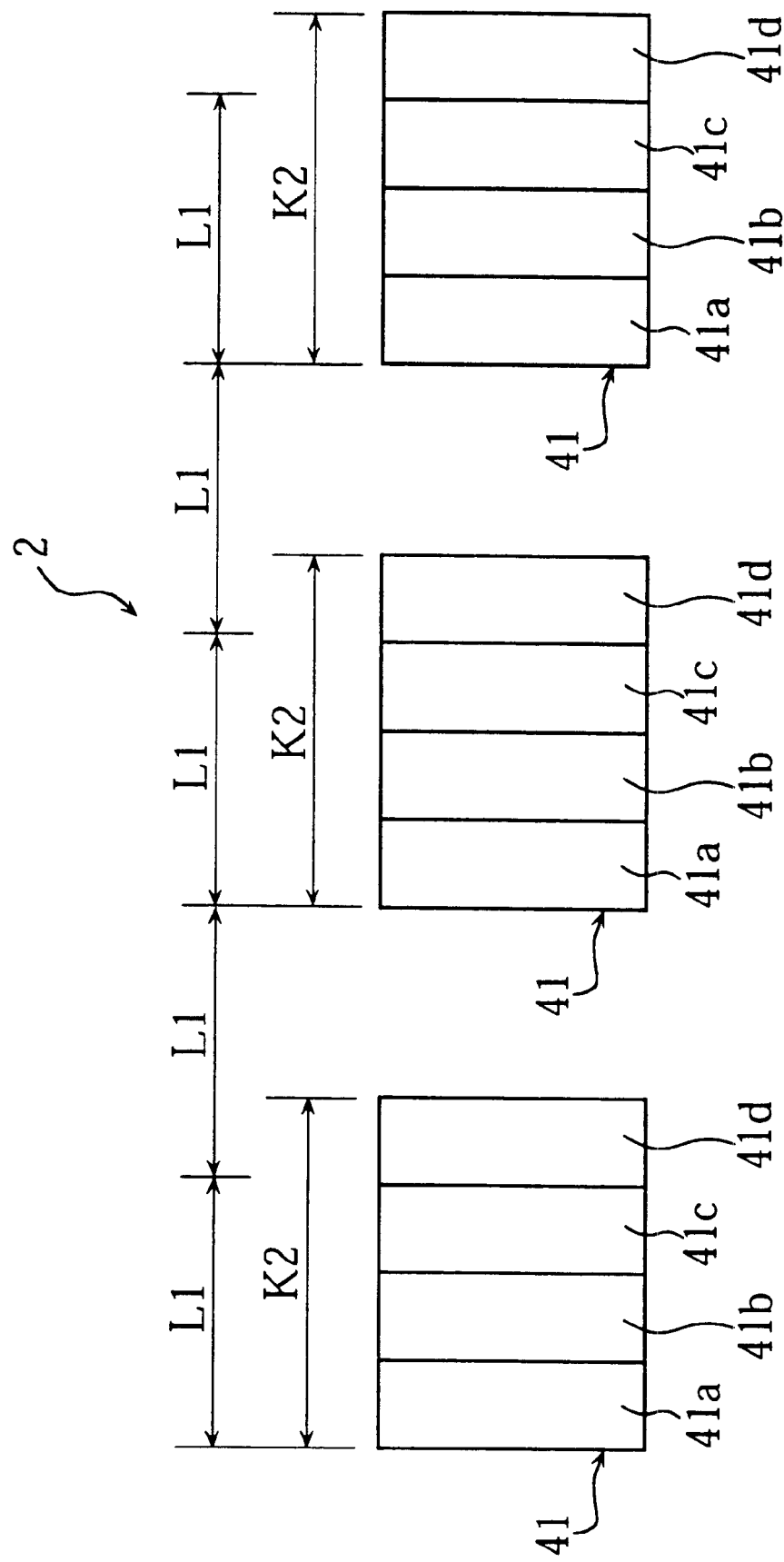
FIG. 13 is a front view of a light receiver according to still another embodiment.

It should also be noted here for the embodiment shown in FIG. 8. If the length K2 of the photodiode group 21 is greater than the length L1 of the pair of transparent portion 6 and nontransparent portion 7, then as shown in FIG. 13, the photodiode groups 41 are provided at a pitch given by a multitude of the L1.

Further, according to the embodiments so far described as above, the difference between K1 and L1 is equal to two of the photodiodes 11a–11d or of the photodiodes 31a–31d.

Likewise, the difference between K2 and L1 is equal to one of the photodiodes 21a–21d or of the photodiodes 41a–41d. Obviously however, the difference between K1 or K2 and L1 may be otherwise, and it is not necessary that the difference be equal to or a multitude of the length of the photodiode. Even so, if the difference between K1 and L1 or between K2 and L1 is too small, to an extent that the difference can be regarded as zero within a range of manufacturing error, then the effect of the present invention described as above will gradually become not evident. For this reason, it is preferable that the difference between K1 and L1 or between K2 and L1 be not smaller than the length of one photodiode being used.

Figure 14:
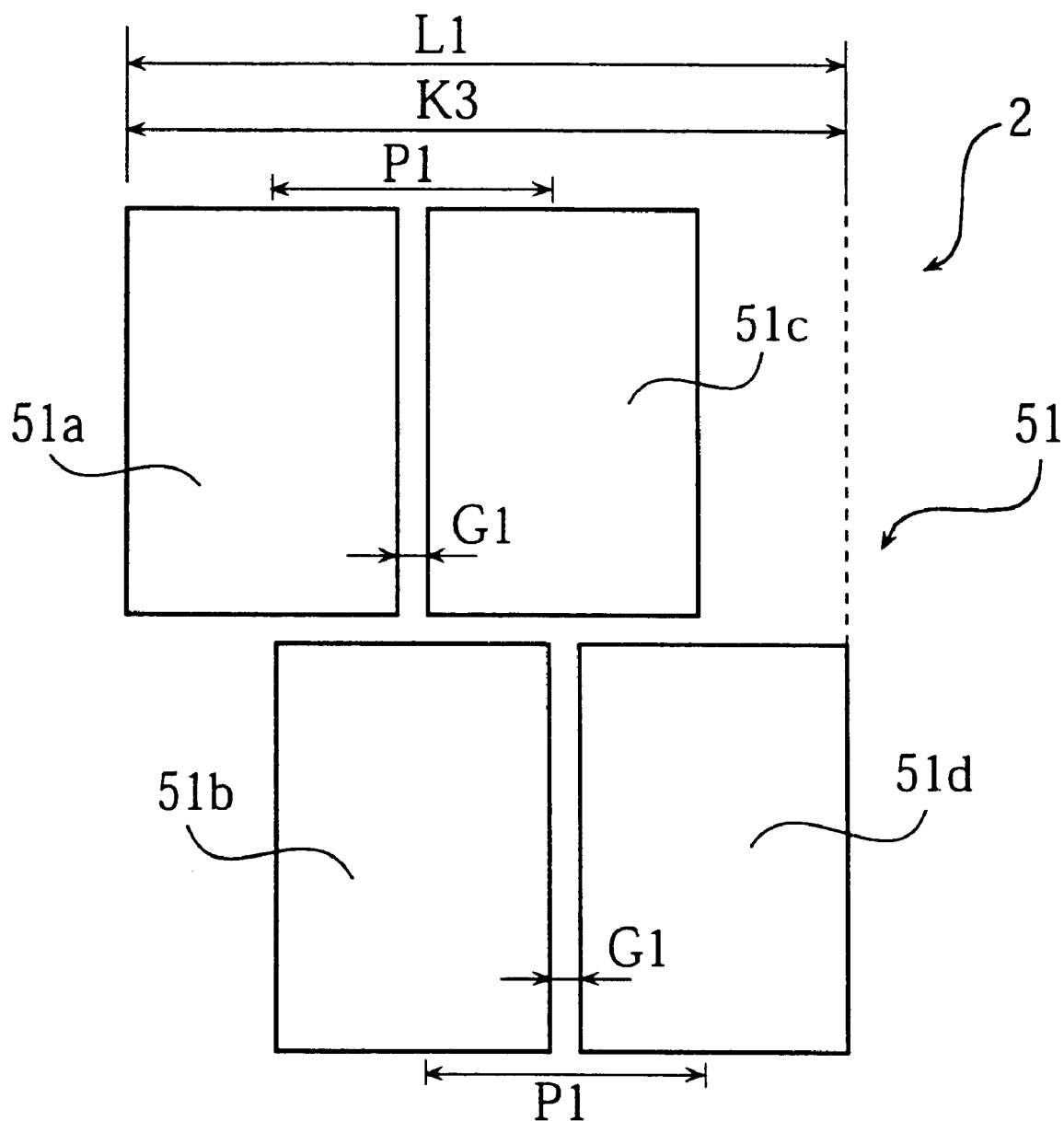
FIG. 14 is a front view of a light receiver according to still another embodiment.

FIG. 14 is a front view of a light receiver in still another embodiment. As shown in the view, the light receiver 2 includes a photodiode group 51 having four photodiodes 51a–51d for example. These four photodiodes 51a–51d are arranged in the direction of relative movement between the optical unit 3 and the light controlling member 5 and in a direction perpendicular thereto. Specifically, the photodiodes 51a–51d are disposed in a diagonally offset pattern, by a pitch P1 in the direction of the relative movement between the optical unit 3 and the light controlling portion 5. The photodiode 51a and the photodiode 51b are offset from each other in the direction of the relative movement between the optical unit 3 and the light controlling portion 5 by (P1)/2. The photodiode 51c and the photodiode 51d are offset from each other in the direction of the relative movement between the optical unit 3 and the light controlling portion 5 by (P1)/2. With this arrangement, a length of the photodiode group 51 in the direction of the relative movement between the optical unit 3 and the light controlling member 5 is K3, which is equal to the length L1 of one pair of transparent portion 6 and nontransparent portion 7.

When the optical unit 3 and the light controlling member 5 make a relative movement longitudinally of the light controlling member 5, the transparent portion 6 and the nontransparent portion 7 of the light controlling member 5 alternately come between the light emitter 1 and the light receiver 2 of the optical unit 3. Therefore, there is a continuous alternation between a state in which light from the light emitter 1 passes through the transparent portion 6 and thus received by the photodiodes 51a–51d of the light receiver 2 and another state in which the light is blocked by the nontransparent portion 7 and thus not received by the photodiodes 51a–51d. If this is viewed from each of the photodiodes 51a–51d, there is a continuous cycle of four states in which a band of the light coming into each of the photodiodes 51a–51d takes different patterns. Specifically, there is a state in which the light is partially blocked by the nontransparent portion 7 and an area of the blockage is gradually decreasing. There is another state in which the light is not blocked at all by the nontransparent portion 7. Still another is a state in which the light is partially blocked by the nontransparent portion 7 and an area of the blockage is gradually increasing, and lastly, there is another state in which the light is completely blocked by the nontransparent portion 7. In the above, phase of the cycle in the photodiodes 51a–51d is sequentially shifted by ⅕ of a period of the cycle, because of the relationship between the length L1 of the pair of transparent portion 6 and nontransparent portion 7 of the light controlling member 5 and an approximate length of each of the photodiodes 51a–51d in the photodiode group 51 as given by the expression 2(K3)/5=2(L1)/5.

Figure 15:
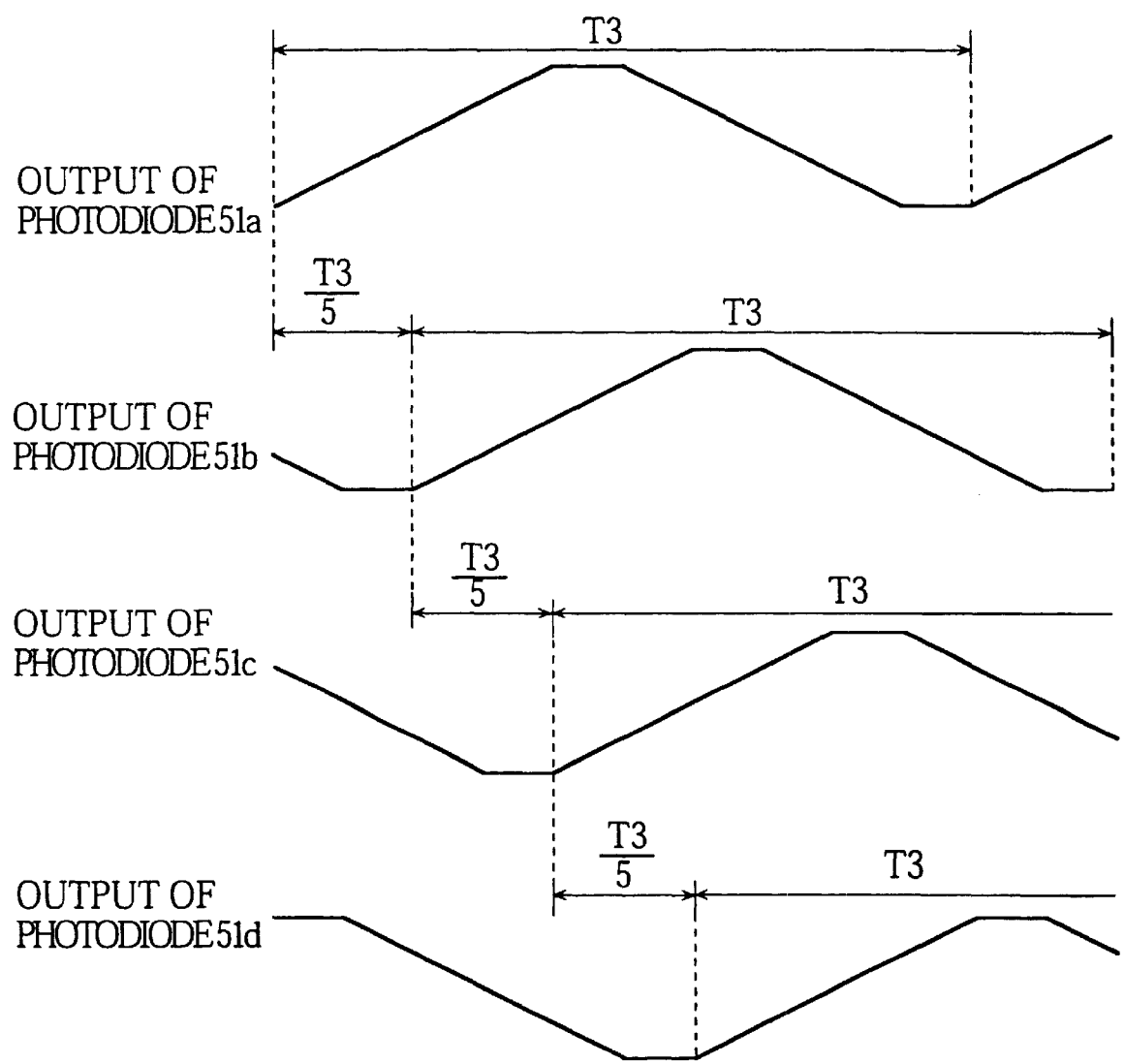
FIG. 15 a diagram showing waveforms of output signals from photodiodes according to the embodiment in FIG. 14.

Therefore, if the light controlling member 5 moves at a constant speed in a direction indicated by Arrow A1 in FIG. 2, or if the optical unit 3 moves at a constant speed in a direction opposite to the direction indicated by Arrow A, the photodiodes 51a–51d give output signals as shown in FIG. 15. As understood from FIG. 15, each of the output signals from the photodiodes 51a–51d has a period of T3, and there is a sequential phase shift of (T3)/5. The period T3 is determined by a relationship among; the length L1 of the pair of transparent portion 6 and nontransparent portion 7 of the light controlling member 5, the approximate length of each of the photodiodes 51a–51d in the photodiode group 11 as given by the expression 2(K3)/5=2(L1)/5, and a speed of the relative movement between the optical unit 3 and the light controlling member 5.

Figure 16:
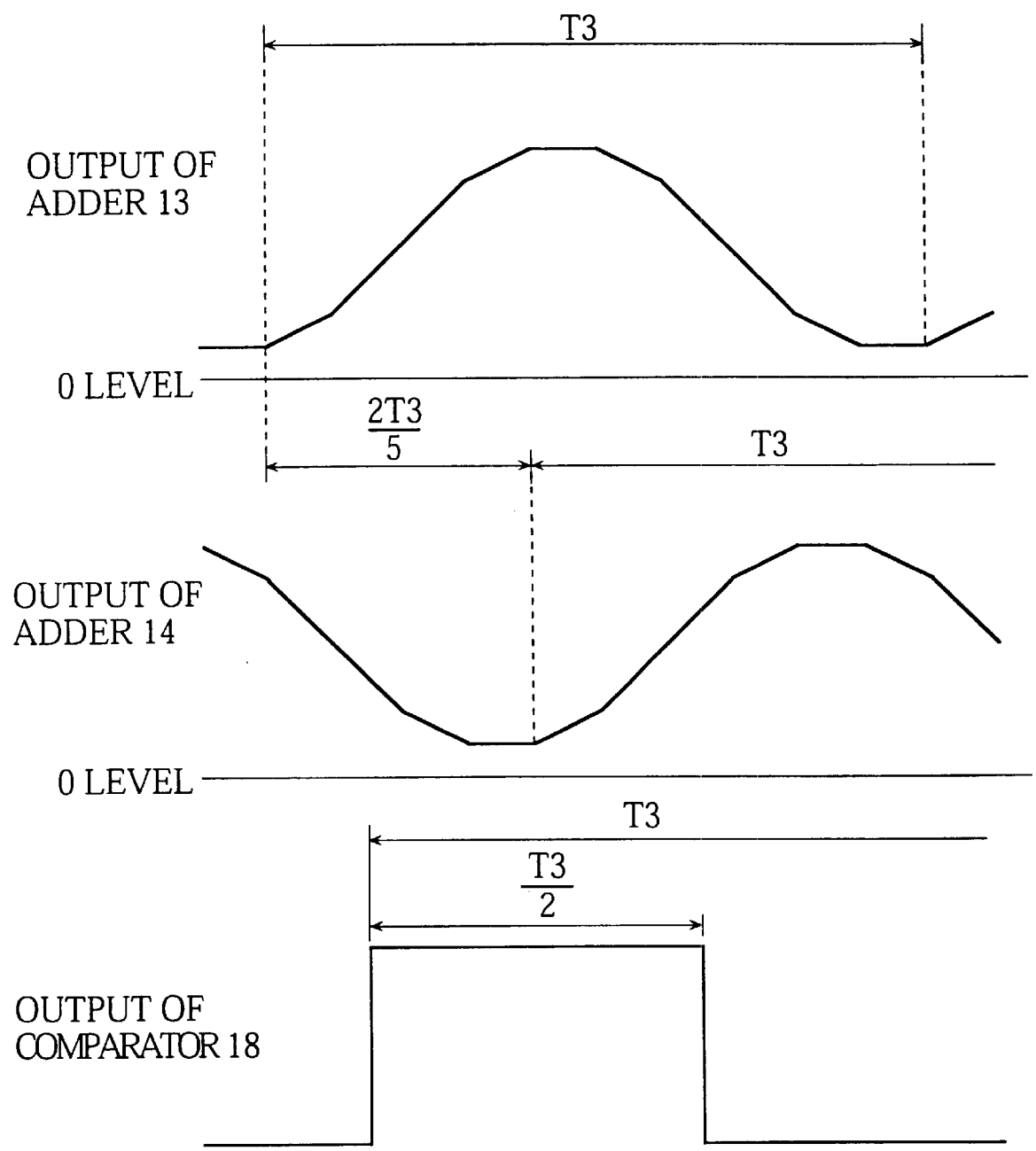
FIG. 16 is a diagram showing waveforms of output signals from adders and a comparator according to the embodiment in FIG. 14.

With this arrangement, an adder 13 outputs a sum of the output from the photodiode 51a and the output from the photodiode 51b. An adder 14 outputs a sum of the output from the photodiode 51c and the output from the photodiode 51d. Therefore, the outputs from these adders are as shown in FIG. 16. A comparator 18 outputs a high-level signal if the output from the adder 13 is greater than the output from the adder 14, while outputting a low-level signal if the output from the adder 13 is smaller than the output from the adder 14. Thus, the output from the comparator 18 is as shown in FIG. 16. As is clear from FIG. 6, the outputs from the adders 13, 14 have the same period T3 as of the outputs from the photodiodes 51a–51d. There is a phase shift of 2(T3)/5 between the output from the adder 13 and the output from the adder 14. The output from the comparator 18 has the same period T3 as the outputs from the adders 13, 14. The output from the comparator 18 is a square pulse, with both of the ON period and OFF period having a period of (T2)/2.

Figure 17:
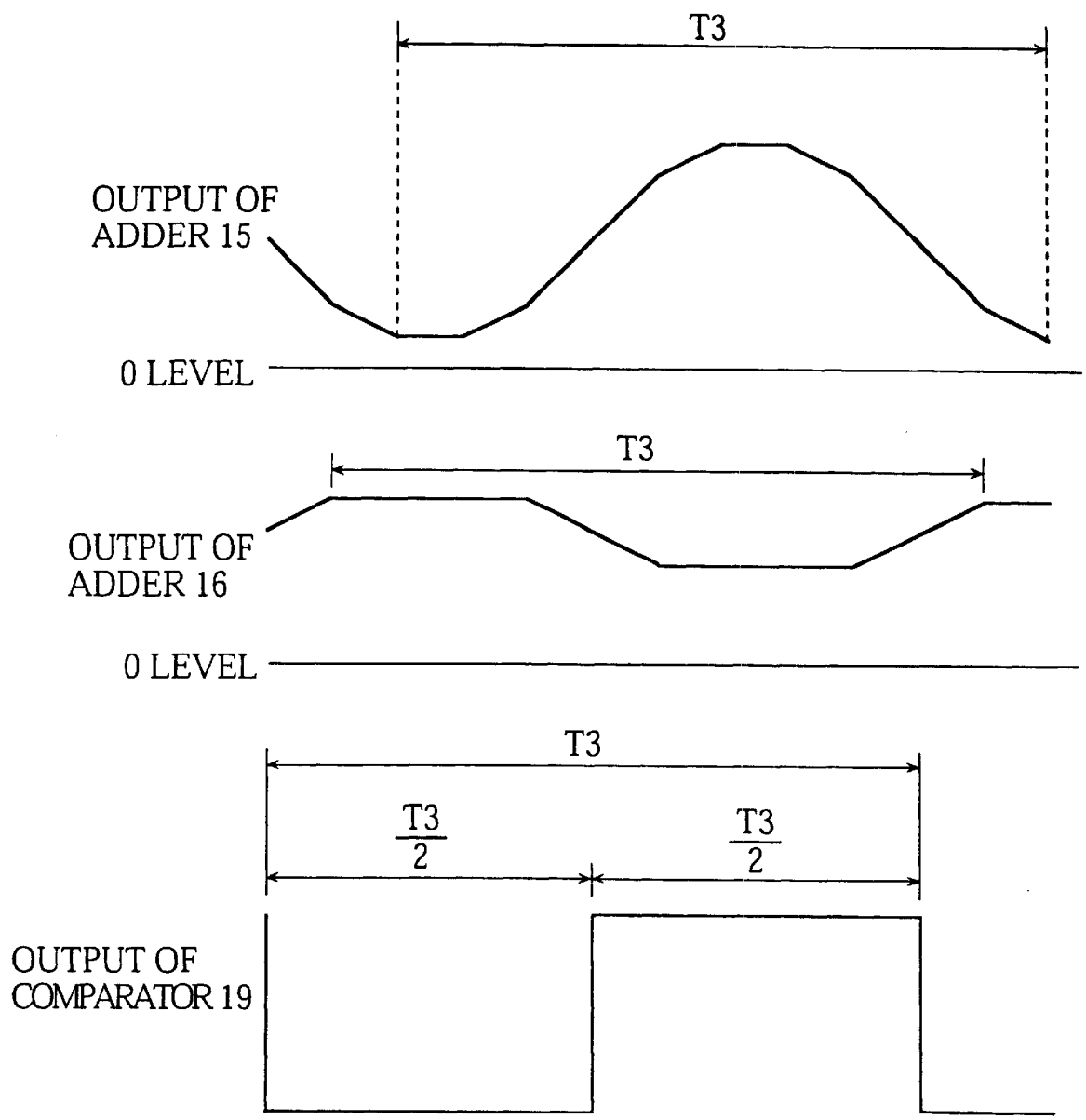
FIG. 17 is a diagram showing waveforms of output signals from adders and a comparator according to the embodiment in FIG. 14.

Further, an adder 15 outputs a sum of the output from the photodiode 51b and the output from the photodiode 51c. Likewise, an adder 16 outputs a sum of the output from the photodiode 51a and the output from the photodiode 51d. Therefore, the outputs from these adders are as shown in FIG. 17. The comparator 19 outputs a high-level signal if the output from the adder 15 is greater than the output from the adder 16, while outputting a low-level signal if the output from the adder 15 is smaller than the output from the adder 16. Thus, the output from the comparator 19 is as shown in FIG. 17. As is clear from FIG. 17, the outputs from the adders 15, 16 have the same period T3 as of the outputs from the photodiodes 51a–51d. The output from the comparator 19 is a square pulse, with both of the ON period and OFF period having a period of (T3)/2.

As is clear from comparison between FIG. 16 and FIG. 17, the output from the comparator 18 and the output from the comparator 19 are both square pulses having the period of T3, and there is a phase shift of (T3)/4 in between.

With the above arrangement, if the direction of the relative movement between the optical unit 3 and the light controlling member 5 is reversed, then the output from the comparator 19 does not change but the output from the comparator 18 is reversed. Therefore, the direction of the relative movement between the optical unit 3 and the light controlling member 5 can be determined by checking the level of output from the comparator 18 upon rising or falling of the output from the comparator 19 for example. Obviously, by counting the number of output pulses from the comparator 18 or the comparator 19, a distance of the relative movement between the optical unit 3 and the light controlling member 5 can be obtained.

As described, the photodiodes 51a–51d are arranged in two pairs in the direction of relative movement between the optical unit 3 and the light controlling member 5 and in another two pairs in the direction perpendicular thereto.

According to this arrangement, a pair of the photodiodes 51a, 51b are arranged in the direction perpendicular to the direction of the relative movement between the optical unit 3 and the light controlling member 5, and so are a pair of the photodiodes 51c, 51d. Thus, in each of these pairs, positions of the photodiodes in the direction of the relative movement between the optical unit 3 and the light controlling member 5 are different from each other. For this reason, it becomes possible to significantly improve detection accuracy.

Specifically, according to the prior art, the photodiodes 111a–111d are disposed in a single line in the direction of the relative movement between the optical unit 103 and the light controlling portion 105. On the contrary, according to the present embodiment, the photodiodes are disposed in a plurality of lines, with a reduced number of the photodiodes 51a–51d per line. As a result, it becomes possible to increase the length in each of the photodiodes 51a–51d in the direction of the relative movement between the optical unit 3 and the light controlling member 5. According to this arrangement, a region of low sensitivity, i.e. a gap G1 between the photodiodes 51a, 51c, and between the photodiodes 51b, 51d, can be small enough as compared with a high-sensitivity region, and thus there is no deterioration in S/N ratio caused by decrease in the outputs from the photodiodes 51a–51b. Therefore, detection accuracy can be improved significantly by decreasing the length L1 of the pair of transparent portion 6 and nontransparent portion 7 of the light controlling member 5.

Obviously, a height of the photodiodes 51a–51d, which is a dimension perpendicular to the relative movement between the optical unit 3 and the light controlling member 5, is reduced to about a half of the size in the prior art. However, the length of the low-sensitivity region G1 between each pair of adjacent photodiodes as compared with the length of the high-sensitivity region grows in acceleration with decrease in the length K3=L1 in the direction of the relative movement between the optical unit 3 and the light controlling portion 5. For this reason, reducing the number of the gaps G1 per line gives an effect far beyond the disadvantage of reducing the height.

According to the embodiment shown in FIG. 14, the photodiode group 51 is made of four photodiodes 51a–51b. However, the number of the photodiodes providing the photodiode group 51 is not limited to four. Specifically, three or greater number of photodiodes may be arranged in the direction of the relative movement between the optical unit 3 and the light controlling member 5. Further, three or greater number of photodiodes may be arranged perpendicular to the direction of the relative movement between the optical unit 3 and the light controlling member 5. Further, three or greater number of photodiodes may be arranged in both of the directions, i.e. in the direction of the relative movement between the optical unit 3 and the light controlling member 5 as well as the direction perpendicular thereto.

Figure 18:
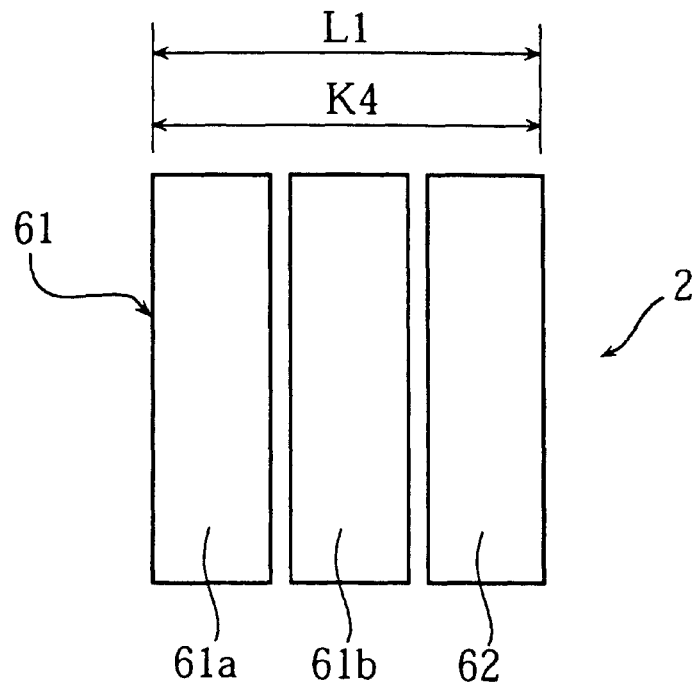
FIG. 18 is a front view of a light receiver according to still another embodiment.

FIG. 18 is a front view of a light receiver in still another embodiment. As shown in FIG. 18, the light receiver 2 includes a photodiode group 61 having three photodiodes 61a, 61b, and 62 for example. These three photodiodes 61a, 61b, 62 are arranged in line in the direction of relative movement between the optical unit 3 and the light controlling member 5. All of the photodiodes 61a, 61b, 62 have a same length in the direction of the arrangement, and a total of the three lengths is K4. In other words, a length of the photodiode group 61 in the direction of the relative movement between the optical unit 3 and the light controlling member 5 is K4, and K4 is equal to L1.

Figure 19:
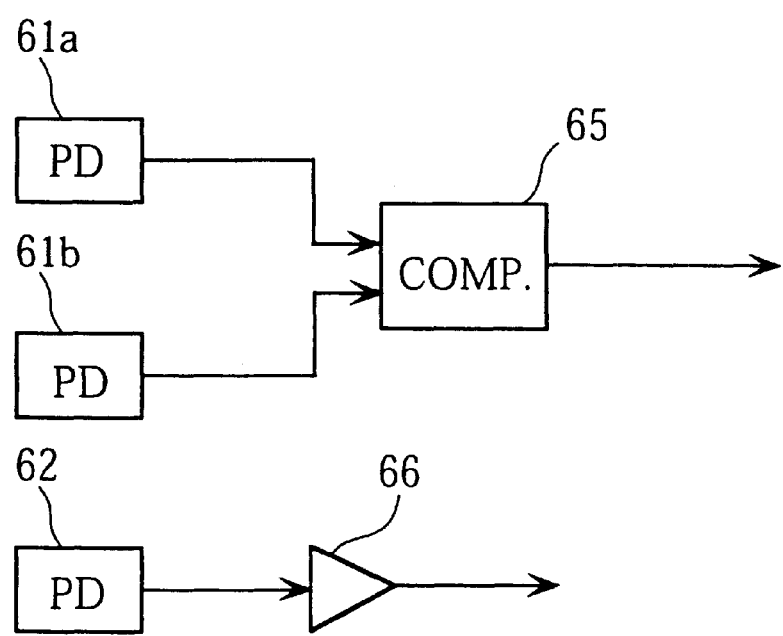
FIG. 19 is a circuit block diagram showing a principal portion of a signal processing circuit according to the embodiment in FIG. 18.

The photodiodes 61a, 61 have output terminals, as shown in FIG. 19, connected with input terminals of a comparator 65. The photodiode 62 has output terminal connected to an input terminal of an amplifier 66. Specifically, according to the present embodiment, the signal processing circuit in FIG. 4 is replaced by the signal processing circuit in FIG. 19.

When the optical unit 3 and the light controlling member 5 make a relative movement longitudinally of the light controlling member 5, the transparent portion 6 and the nontransparent portion 7 of the light controlling member 5 alternately come between the light emitter 1 and the light receiver 2 of the optical unit 3. Therefore, there is a continuous alternation between a state in which light from the light emitter 1 passes through the transparent portion 6 and thus received by the photodiodes 61a, 61b, 62 of the light receiver 2 and another state in which the light is blocked by the nontransparent portion 7 and thus not received by the photodiodes 61a, 61b, 62. If this is viewed from each of the photodiodes 61a, 61b, 62, there is a continuous cycle of four states in which a band of the light coming into each of the photodiodes 61a, 61b, 62 takes different patterns. Specifically, there is a state in which the light is partially blocked by the nontransparent portion 7 and an area of the blockage is gradually decreasing. There is another state in which the light is not blocked at all by the nontransparent portion 7. Still another is a state in which the light is partially blocked by the nontransparent portion 7 and an area of the blockage is gradually increasing, and lastly, there is another state in which the light is completely blocked by the nontransparent portion 7. In the above, phase of the cycle in the photodiodes 61a, 61b, 62 is sequentially shifted by ⅓ of a period of the cycle, because of a relationship between the length L1 of one pair of the transparent portion 6 and the nontransparent portion 7 of the light controlling member 5 and the length of each of the photodiodes 61a, 61b, 62 in the photodiode group 61 as given by the expression (K4)/3=(L1)/3.

Figure 20:
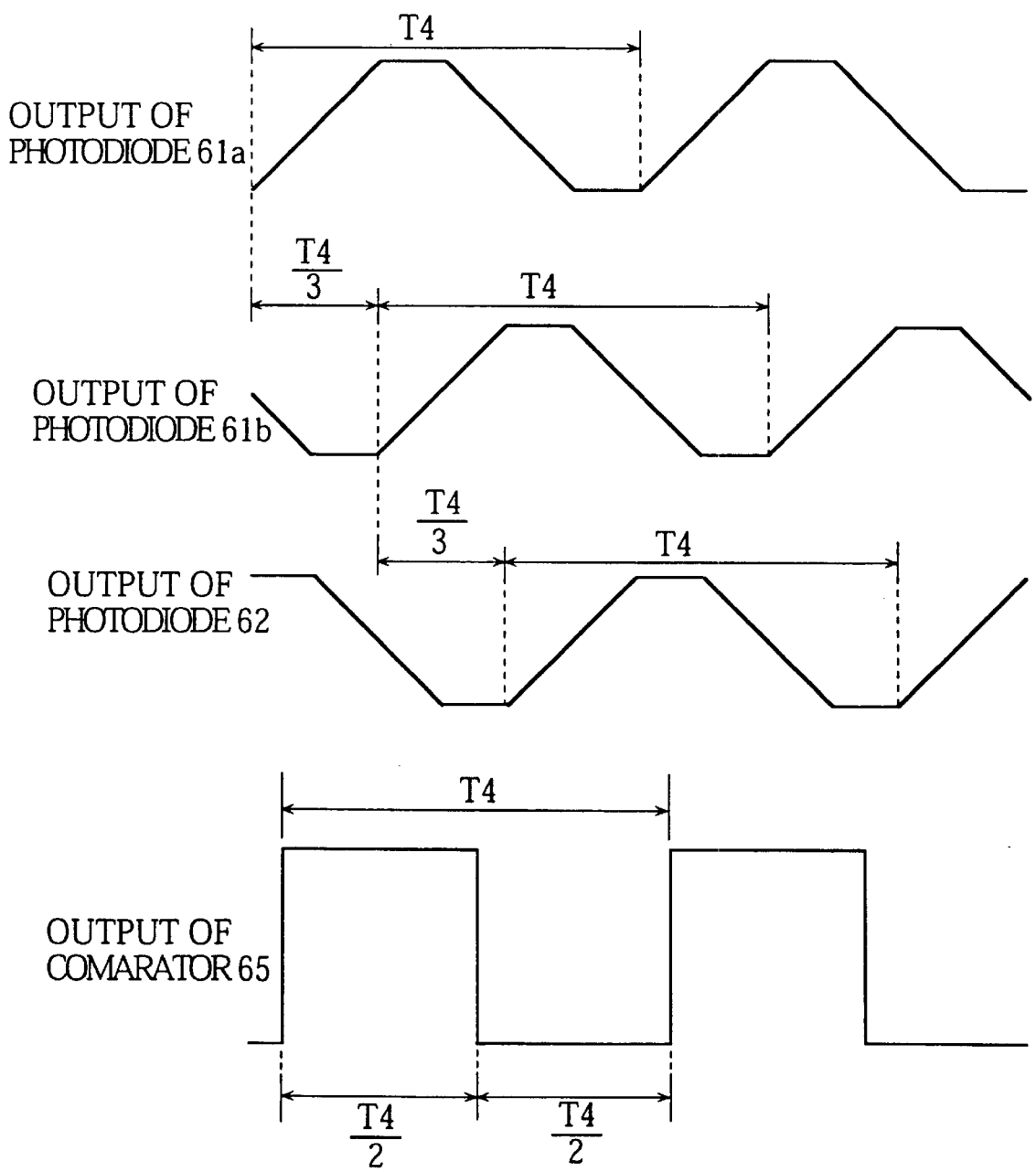
FIG. 20 a diagram showing waveforms of output signals from photodiodes and a comparator according to the embodiment in FIG. 18.

Therefore, if the light controlling member 5 moves at a constant speed in a direction indicated by Arrow A1 in FIG. 2, or if the optical unit 3 moves at a constant speed in a direction opposite to the direction indicated by Arrow A, the photodiodes 61a, 61b, 62 give output signals as shown in FIG. 20. As is clear from FIG. 20, each of the output signals from the photodiodes 61a, 61b, 62 has a period of T4, and there is a sequential phase shift of (T4)/3. The period T4 is determined by a relationship among; the length L1 of one pair of the transparent portion 6 and the nontransparent portion 7 of the light controlling member 5, the length of each of the photodiodes 61a, 61b, 62 in the photodiode group 61 as given by the expression (K4)/3=(L1)/3, and a speed of the relative movement between the optical unit 3 and the light controlling member 5.

With this arrangement, a comparator 65 outputs a high-level signal if the output from the photodiode 61a is greater than the output from the photodiode 61b, while outputting a low-level signal if the output from the photodiode 61a is smaller than the output from the photodiode 61b. Thus, the output from the comparator 65 is as shown in FIG. 20. As is clear from FIG. 20, the output from the comparator 65 has the same period T4 as of the outputs from the photodiodes 61a, 61b, 62. The output from the comparator 65 is a square pulse, with both of the ON period and OFF period having a period of (T4)/2. The output from the photodiode 62, i.e. the output from the amplifier 66, assumes high level at a point when the output from the comparator 65 rises, and assumes low level at a point when the output from the comparator 65 falls.

Figure 21:
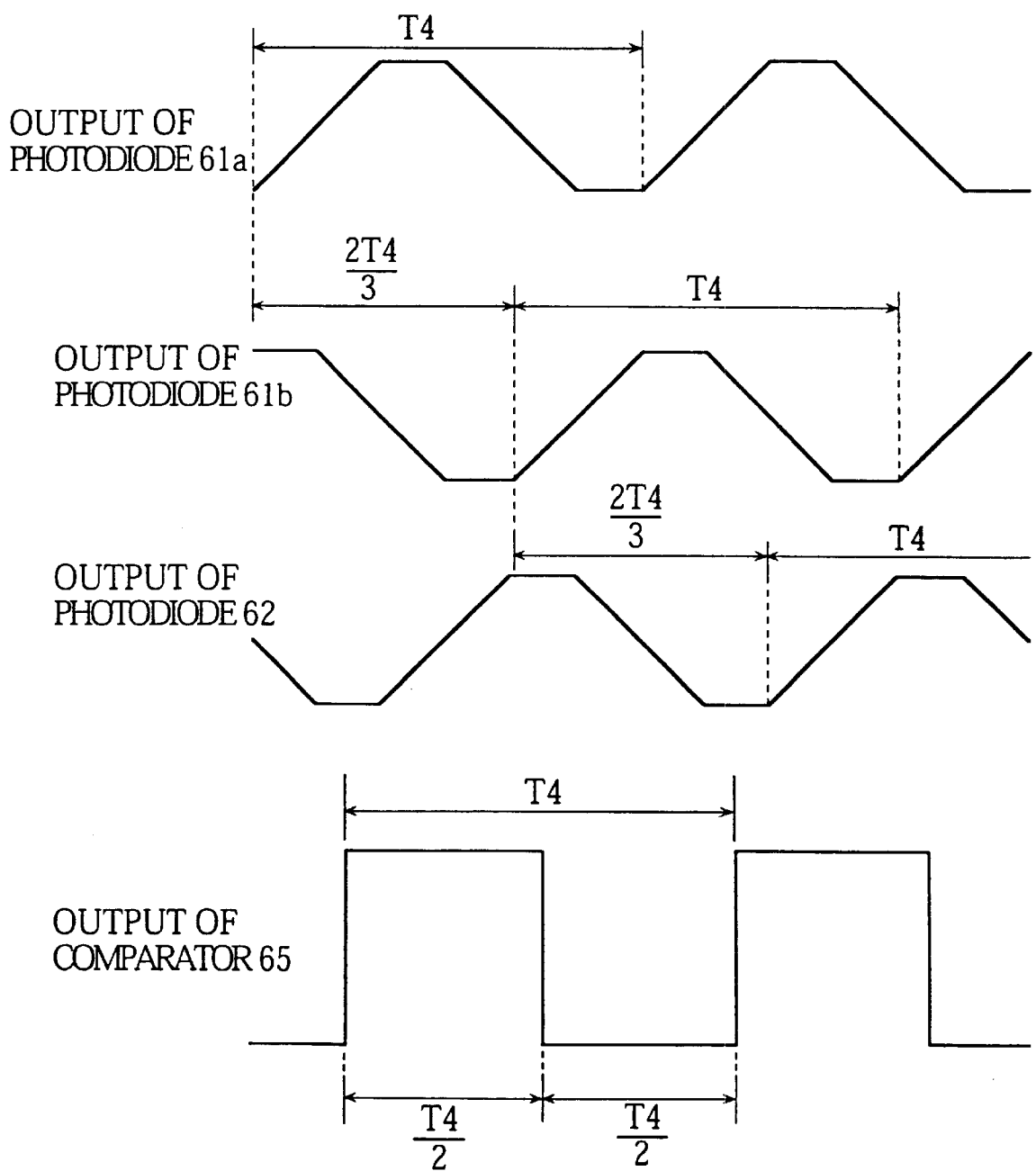
FIG. 21 a diagram showing waveforms of output signals from the photodiodes and the comparator according to the embodiment in FIG. 18.

On the contrary, if the light controlling member 5 moves at a constant speed in a direction opposite to the direction indicated by Arrow A1 in FIG. 2, or if the optical unit 3 moves at a constant speed in the direction indicated by Arrow A, the photodiodes 61a, 61b, 62 give output signals as shown in FIG. 21. As is clear from FIG. 21, each of the output signals from the photodiodes 61a, 61b, 62 has a period of T4, and there is a sequential phase shift of 2(T4)/3.

With this arrangement, a comparator 65 outputs a high-level signal if the output from the photodiode 61a is greater than the output from the photodiode 61b, while outputting a low-level signal if the output from the photodiode 61a is smaller than the output from the photodiode 61b. Thus, the output from the comparator 65 is as shown in FIG. 21. As is clear from FIG. 21, the output from the comparator 65 has the same period T4 as of the outputs from the photodiodes 61a, 61b, 62. The output from the comparator 65 is a square pulse, with both of the ON period and OFF period having a period of (T4)/2. The output from the photodiode 62, i.e. the output from the amplifier 66, assumes low level at a point when the output from the comparator 65 rises, and assumes high level at a point when the output from the comparator 65 falls.

With the above arrangement, the direction of the relative movement between the optical unit 3 and the light controlling member 5 can be discerned by checking the level of output from the amplifier 66 at the point of rise or fall of the signal from the comparator 65. Further, by counting the number of output pulses from the comparator 65, a distance of the relative movement between the optical unit 3 and the light controlling member 5 can be obtained. Further, such a function as this can be provided based on three photodiodes 61a, 61b, 62, i.e. the number of photodiodes can be reduced by one as compared with the prior art. Therefore, cost of manufacture can be reduced significantly. In addition, if the length of the photodiode group 61 in the direction of the arrangement of the photodiodes 61a, 61b, 62 is the same as in the prior art, each of the photodiodes 61a, 61b, 62 has a longer length in the direction of the arrangement, making possible to increase the area of each photodiodes 61a, 61b, 62, resulting in improved sensitivity to the light. Conversely speaking, if the length in each of the photodiodes 61a, 61b, 62 in the direction of the arrangement is the same as in the prior art, the photodiode group 61 has a shorter length in the direction of the arrangement of the photodiodes 61a, 61b, 62. Therefore, even if the length L1 of the pair of transparent portion 6 and nontransparent portion 7 in the direction of the arrangement is made smaller, manufacture of the photodiode group 61 becomes possible. Still further, the signals from the photodiodes 61a, 61b, 62 can be processed by one comparator 65 and one amplifier 66. This means circuit can be simplified and the cost of manufacture can be reduced significantly.

It should be noted here that according to the embodiment shown in FIG. 8, the photodiode group 61 includes three photodiodes 61a, 61b, 62. However, the photodiode group 11 may include five or greater odd number of photodiodes. Specifically, plural pairs of the photodiodes 61a, 61b may be provided. In this case, the same number of comparators 65 as the number of the pairs of photodiodes 61a, 61b are provided, or in addition, a plurality of adders are provided. With this arrangement, direction of the relative movement between the optical unit 3 and the light controlling member 5 can be detected based on an output from one of the comparators 65 and an output from the photodiode 62. Obviously, if a plurality of the pairs of photodiodes 61a, 61b are provided as described above, outputs from only one pair of the photodiodes 61a, 61b are used, and outputs from the other pairs may be used for any other function. In order to achieve such other functions, whatever computing elements, not limited to the comparators and the adders, may be provided in accordance with desired use.

Further, according to the embodiment shown in FIG. 18, the length K4 of the photodiode group 61 is equal to the length L1 of the pair of transparent portion 6 and the nontransparent portion 7. However, the length K1 of the photodiode group 11 may be greater or smaller than the length L1 of the pair of transparent portion 6 and nontransparent portion 7.

Still further, according to the embodiment in FIG. 18, the length of photodiodes 61a, 61b, 62 in the direction of the arrangement is equal to each other. However, this may not necessarily be so. For example, the length of the photodiodes 61a and 61b in the direction of the arrangement may be the same but the length of the photodiode 62 may be different, or each of the photodiodes 61a, 61b, 62 may have a different length in the direction of the arrangement.

Figure 22:
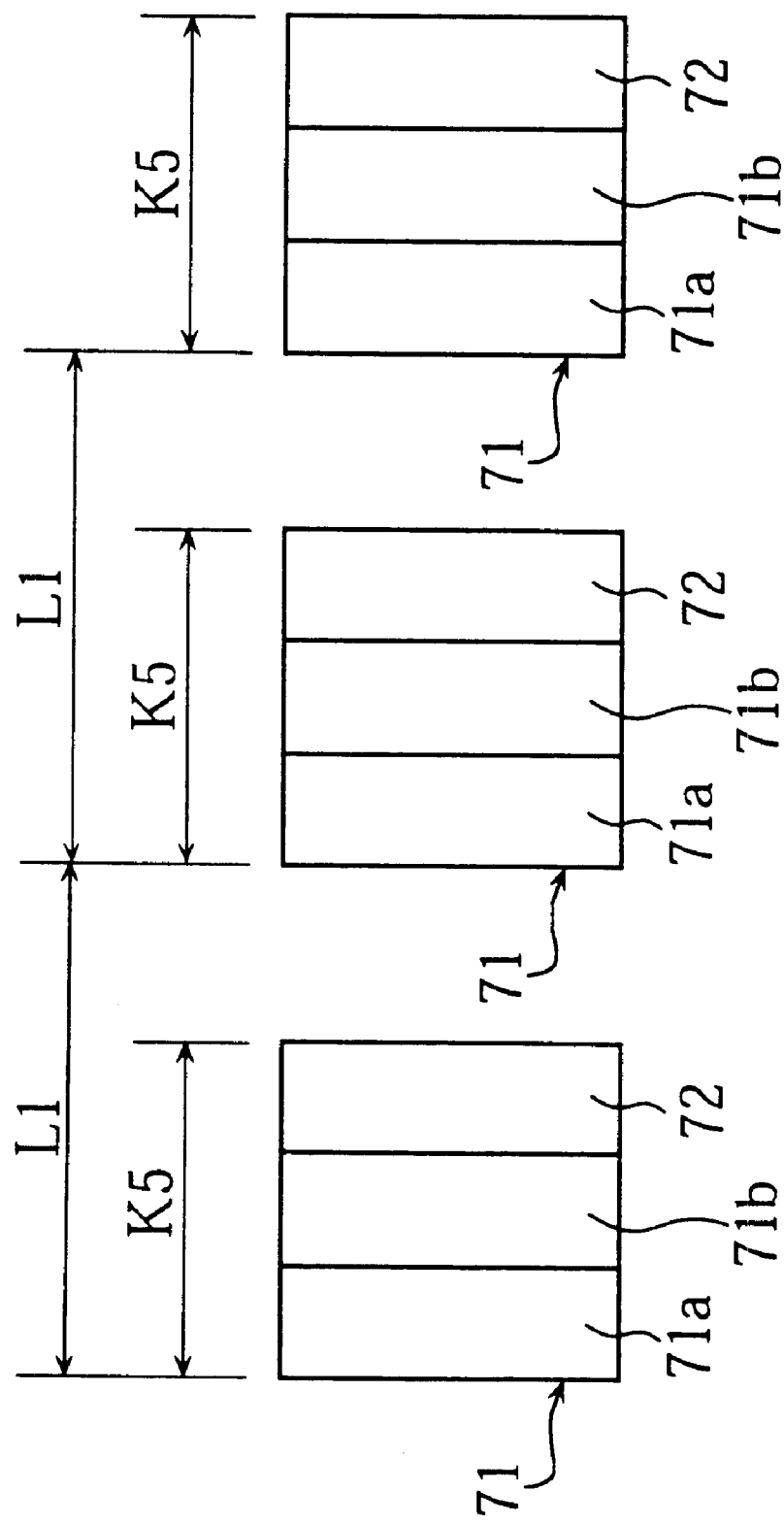
FIG. 22 is a front view of a light receiver according to still another embodiment.

Further, according to the embodiment in FIG. 18, the light receiver 2 is provided by one photodiode group 61. However, the light receiver 2 may be provided by a plurality of photodiode groups 71. In this case, if a length K5 of the photodiode group 71 is smaller than or equal to the length L1 of the pair of transparent portion 6 and nontransparent portion 7, then as shown in FIG. 22, the photodiode groups 71 are disposed at a pitch equal to the length L1 of the pair of transparent portion 6 and nontransparent portion 7.

Figure 23:
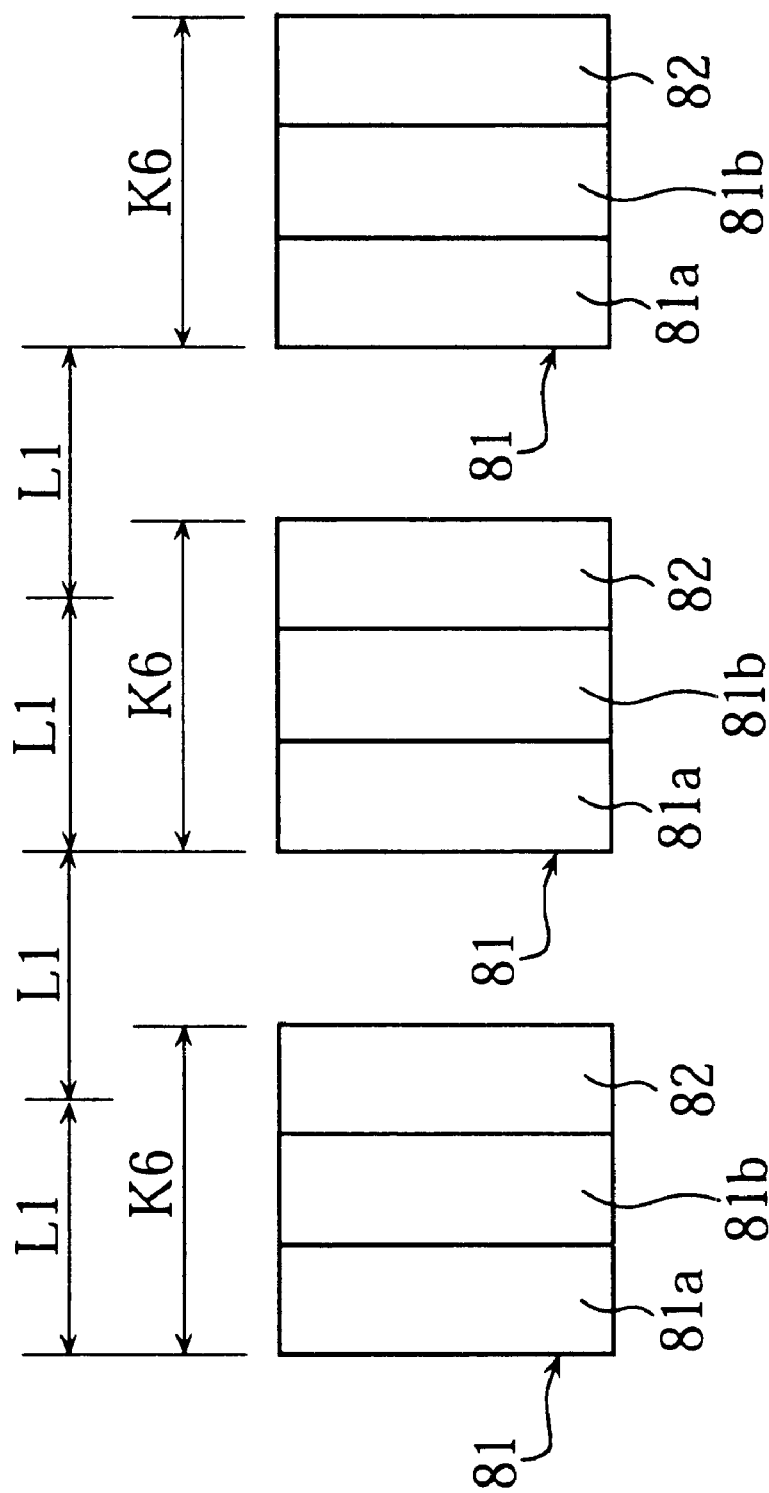
FIG. 23 is a front view of a light receiver according to still another embodiment.
Figure 24:
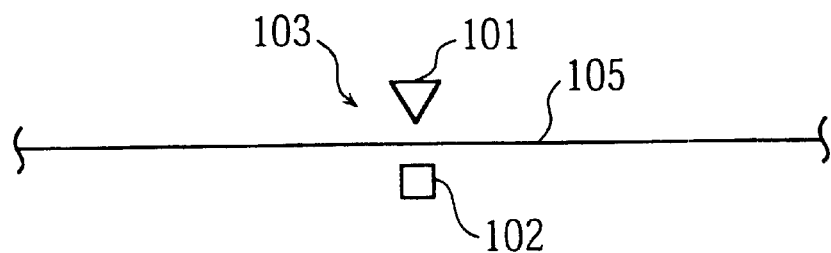
FIG. 24 is a schematic diagram of a prior art optical encoder.
Figure 25:
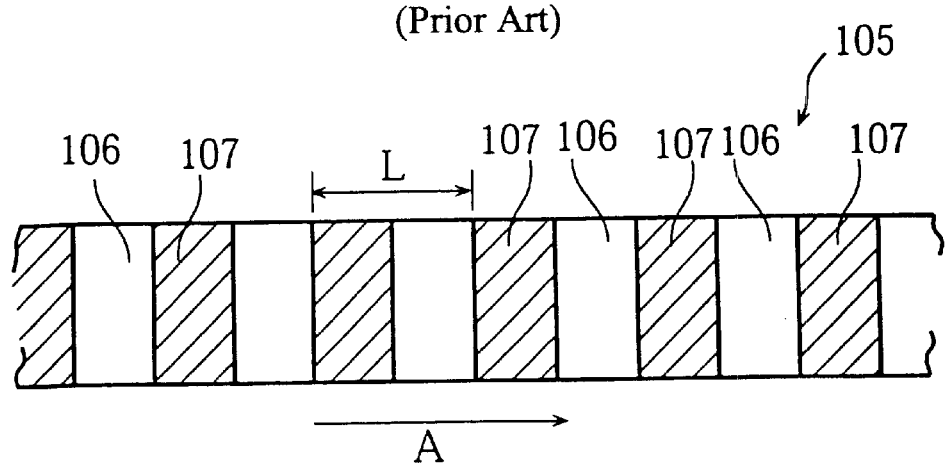
FIG. 25 is a front view of a light controlling member according to the prior art optical encoder.
Figure 26:
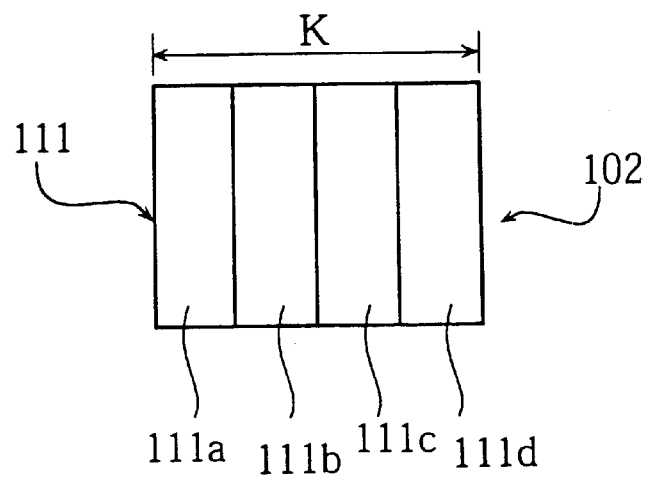
FIG. 26 is a front view of a light receiver according to the prior art optical encoder.
Figure 27:
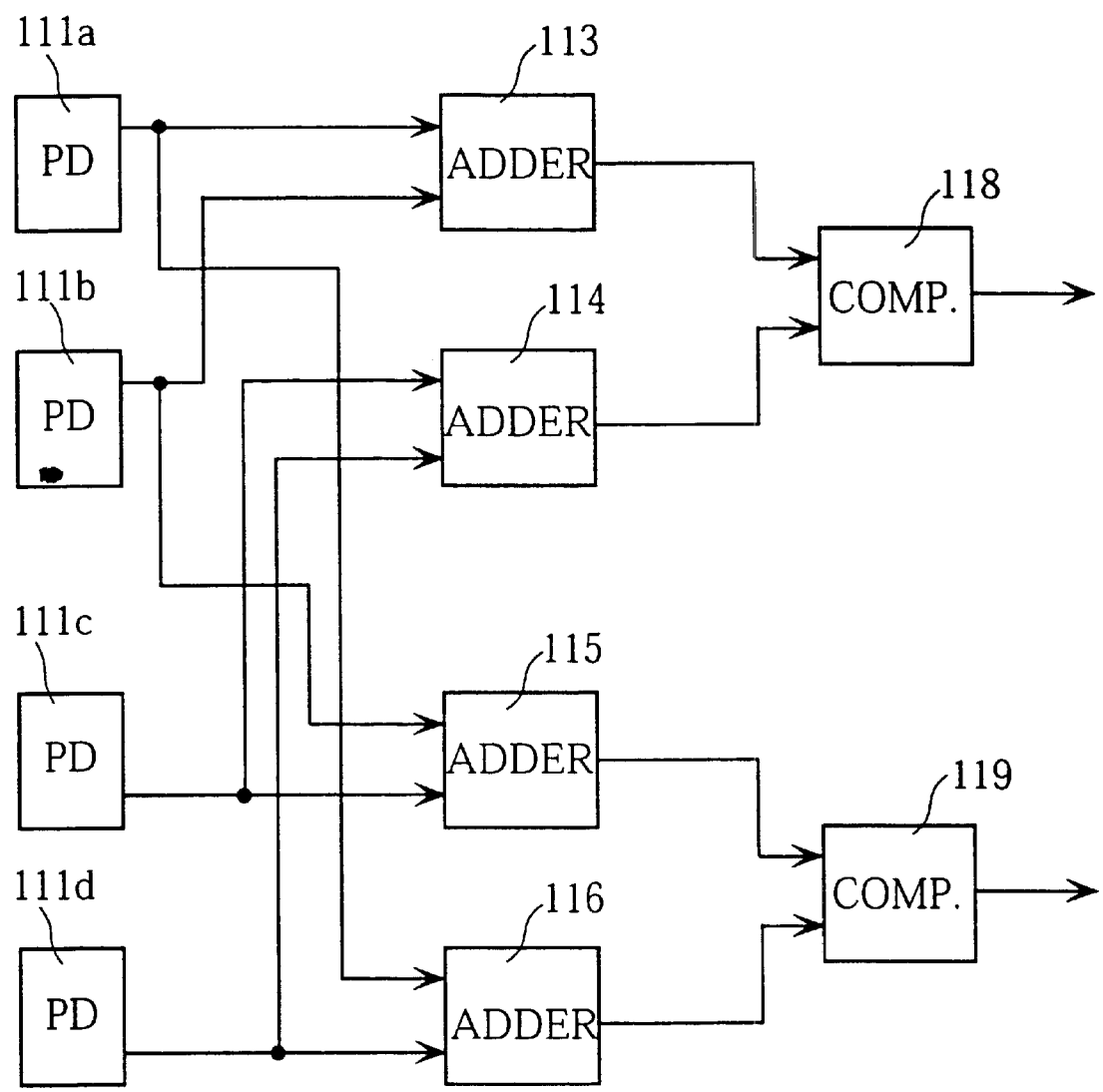
FIG. 27 is a circuit block diagram showing a principal portion of a signal processing circuit for a signal from the light receiver according to the prior art optical encoder.
Figure 28:
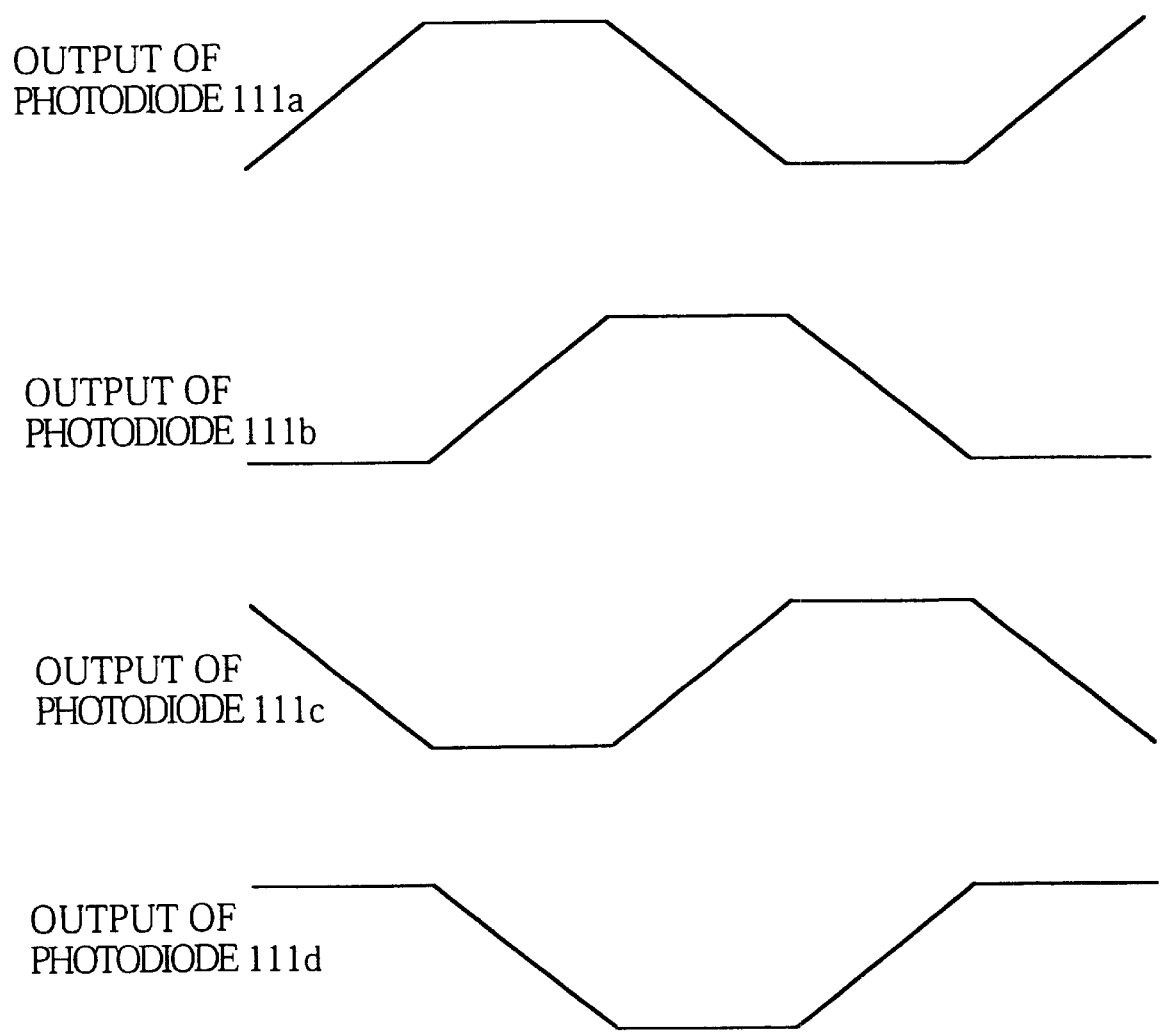
FIG. 28 is a diagram showing waveforms of output signals from photodiodes according to the prior art.
Figure 29:
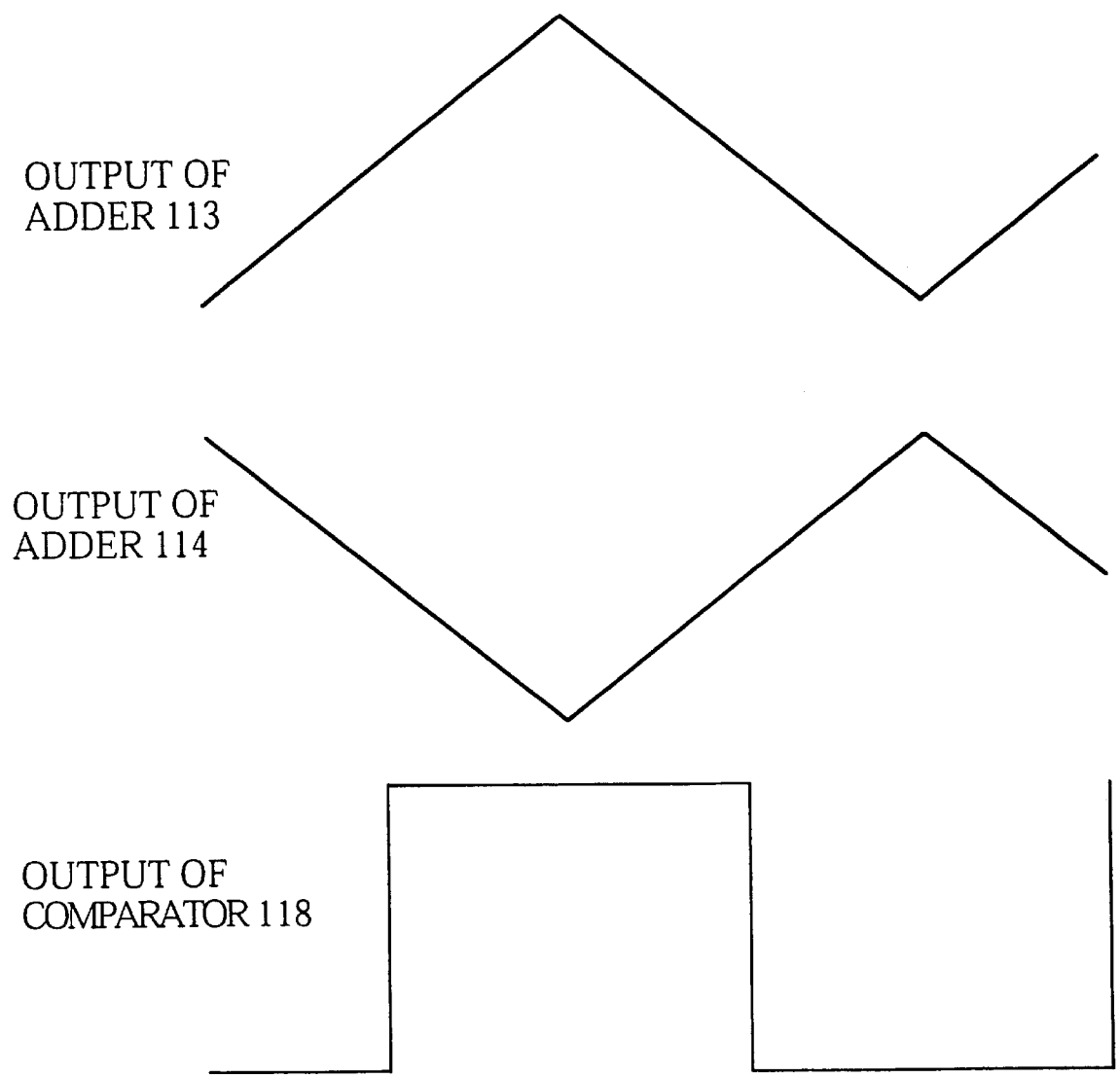
FIG. 29 is a diagram showing waveforms of output signals from adders and a comparator according to the prior art.
Figure 30:
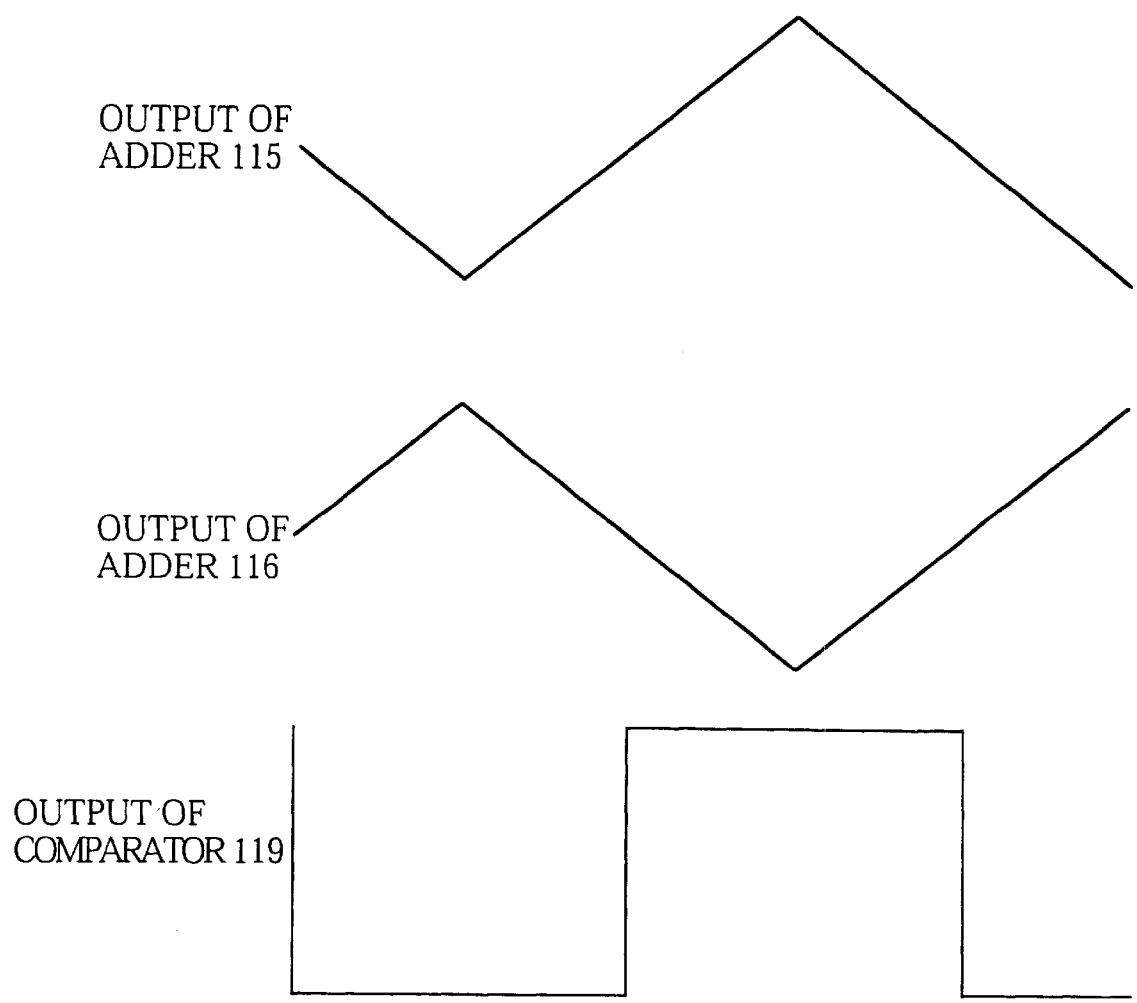
FIG. 30 is a diagram showing waveforms of output signals from adders and a comparator according to the prior art.

On the other hand, if a length K6 of the photodiode group 81 is greater than the length L1 of the pair of transparent portion 6 and nontransparent portion 7, then as shown in FIG. 23, the photodiode groups 81 are disposed at a pitch equal to a multiple of the length L1 of the pair of transparent portion 6 and nontransparent portion 7.

According to these arrangements, each of the photodiodes 71a, 71b, 72 or 81a, 81b, 82 includes the above plurality of photodiodes. Thus, by adding the outputs from these photodiodes, a large output can be obtained, and it becomes possible to eliminate the amplifier 66.

It should be noted here that photodiodes are used as the light receiver group according to each of the above embodiments. However, the light receiver group is not necessarily be provided by the photodiode group, but may be provided by phototransistors for example.

Further, the ribbon-like light controlling member 5 is used in each of the above embodiments. Alternatively, an annular light controlling member may be used. In this case, the optical unit 3 and the light controlling member move relatively to each other on a circumference of a circle.

What is claimed is:

1. An optical encoder comprising:

an optical unit including a light emitter for emitting light and a light receiver for receiving the light from the light emitter; and a linear light controlling member including a plurality of transparent portions for passing the light from the light emitter and a plurality of nontransparent portions disposed alternately with the transparent portions for blocking the light from the light emitter, the transparent and the nontransparent portions being so arranged that any pair of adjacent transparent portion and nontransparent portion has a constant length longitudinally of the light controlling member, each transparent portion and each nontransparent portion being equal in length longitudinally of the light controlling member;

the optical unit and the light controlling member being movable relative to each other longitudinally of the light controlling member;

wherein the light receiver comprises a light receiver group including a plurality of light receiving elements arranged longitudinally of the light controlling member, each of the light receiving elements having a width longitudinally of the light controlling member, the width of each light receiving element being smaller than said constant length of the adjacent transparent portion and nontransparent portion;

wherein the light receiver group has a length longitudinally of the light controlling member, the length of the light receiver group being different from said constant length of the adjacent transparent portion and nontransparent portion by an amount which is no less than the width of each light receiving element.

2. The optical encoder according to claim 1, wherein the length of the light receiver group is smaller than said constant length of the adjacent transparent and nontransparent portions.

3. The optical encoder according to claim 1, wherein the length of the light receiver group is greater than said constant length of the adjacent transparent and nontransparent portions.

4. The optical encoder according to claim 1, wherein the light receiver comprises a plurality of light receiver groups arranged longitudinally of the light controlling member at a pitch which is equal to or a multiple of said constant length of the adjacent transparent and nontransparent portions.

5. An optical encoder comprising:

an optical unit including a light emitter for emitting light and a light receiver for receiving the light from the light emitter; and a linear light controlling member including a plurality of transparent portions for passing the light from the light emitter and a plurality of nontransparent portions disposed alternately with the transparent portions for blocking the light from the light emitter, the transparent and the nontransparent portions being so arranged that any pair of adjacent transparent portion and nontransparent portion has a constant length longitudinally of the light controlling member, each transparent portion and each nontransparent portion being equal in length longitudinally of the light controlling member;

the optical unit and the light controlling member being movable relative to each other longitudinally of the light controlling member;

wherein the light receiver comprises a light receiver group including a first row of light receiving elements and a second adjacent row of light receiving elements, the first row and the second row extending longitudinally of the light controlling member but spaced from each other perpendicularly to the light controlling member; and wherein the light receiving elements in each row being arranged at a predetermined pitch longitudinally of the light controlling member, the first row of light receiving elements is offset from the second row of light receiving elements longitudinally of the light controlling member by an amount which is half the predetermined pitch.

6. An optical encoder comprising:

an optical unit including a light emitter for emitting light and a light receiver for receiving the light from the light emitter; and a linear light controlling member including a plurality of transparent portions for passing the light from the light emitter and a plurality of nontransparent portions disposed alternately with the transparent portions for blocking the light from the light emitter, the transparent and the nontransparent portions being so arranged that any pair of adjacent transparent portion and nontransparent portion has a constant length longitudinally of the light controlling member, each transparent portion and each nontransparent portion being equal in length longitudinally of the light controlling member;

the optical unit and the light controlling member being movable relative to each other longitudinally of the light controlling member;

wherein the light receiver comprises a light receiver group including at least a first, a second and a third light receiving elements; and wherein the optical encoder further comprises a comparator for comparing respective outputs from the first and second light receiving elements to generate pulses, and means for discerning direction of relative movement between the optical unit and the light controlling member by checking output from the third light receiving element upon rise or fall of the pulses.

7. The optical encoder according to claim 6, wherein the light receiver group has a length longitudinally of the light controlling member, said length of the light receiver group being generally equal to said constant length of the adjacent transparent and nontransparent portions.

8. The optical encoder according to claim 6, wherein the light receiver comprises a plurality of light receiver groups arranged longitudinally of the light controlling member at a pitch which is equal to or a multiple of said constant length of the adjacent transparent and nontransparent portions.

* * * * *